(12) United States Patent
Ramaswamy

(10) Patent No.: US 8,683,504 B2
(45) Date of Patent: *Mar. 25, 2014

(54) METHODS AND APPARATUS TO MONITOR AUDIO/VISUAL CONTENT FROM VARIOUS SOURCES

(75) Inventor: Arun Ramaswamy, Tampa, FL (US)

(73) Assignee: The Nielsen Company (US), LLC., Schaumburg, IL (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/341,575

(22) Filed: Dec. 30, 2011

(65) Prior Publication Data

US 2012/0102515 A1 Apr. 26, 2012

Related U.S. Application Data

(63) Continuation of application No. 12/725,018, filed on Mar. 16, 2010, now Pat. No. 8,108,888, which is a continuation of application No. 11/672,706, filed on Feb. 8, 2007, now Pat. No. 7,712,114, which is a continuation of application No. PCT/US2005/028106, filed on Aug. 9, 2005.

(60) Provisional application No. 60/600,007, filed on Aug. 9, 2004.

(51) Int. Cl.
*H04H 60/32* (2008.01)

(52) U.S. Cl.
USPC ............. 725/19; 725/14; 725/15; 725/16; 725/17; 725/18

(58) Field of Classification Search
USPC .................... 725/14–19; 381/94.1
See application file for complete search history.

(56) References Cited

U.S. PATENT DOCUMENTS

| 3,281,695 A | 10/1966 | Bass |
| 3,315,160 A | 4/1967 | Goodman |

(Continued)

FOREIGN PATENT DOCUMENTS

| CN | 1244982 | 2/2000 |
| DE | 3401762 | 8/1985 |

(Continued)

OTHER PUBLICATIONS

USPTO, "Office Action," issued in connection with U.S. Appl. No. 11/388,555, on Dec. 27, 2007 (6 pages).

(Continued)

*Primary Examiner* — Hunter B Lonsberry
(74) *Attorney, Agent, or Firm* — Hanley, Flight & Zimmerman, LLC

(57) ABSTRACT

Methods and apparatus to monitor audio/visual content from various sources are disclosed. An example method disclosed herein comprises determining first information based on a video signal corresponding to monitored media content, determining second information based on an audio signal corresponding to the monitored media content, and identifying a selected one of a plurality of media content sources based on a decision tree comprising a plurality of decision nodes, a first decision node of the decision tree corresponding to a first classification decision resulting from processing at least one of the first information or second information, and a second decision node of the decision tree corresponding to a second classification decision resulting from processing at least one of the first information or second information, the second decision node of the decision tree being selected for evaluation based on an outcome of evaluating the first decision node of the decision tree.

32 Claims, 24 Drawing Sheets

(56) References Cited

U.S. PATENT DOCUMENTS

| | | | |
|---|---|---|---|
| 3,483,327 A | 12/1969 | Schwartz | |
| 3,633,112 A | 1/1972 | Anderson | |
| 3,651,471 A | 3/1972 | Haselwood et al. | |
| 3,733,430 A | 5/1973 | Thompson et al. | |
| 3,803,349 A | 4/1974 | Watanabe | |
| 3,906,454 A | 9/1975 | Martin | |
| 3,947,624 A | 3/1976 | Miyake | |
| 4,027,332 A | 5/1977 | Wu et al. | |
| 4,044,376 A | 8/1977 | Porter | |
| 4,058,829 A | 11/1977 | Thompson | |
| 4,245,245 A | 1/1981 | Matsumoto et al. | |
| 4,388,644 A | 6/1983 | Ishman et al. | |
| 4,546,382 A | 10/1985 | McKenna et al. | |
| 4,566,030 A | 1/1986 | Nickerson et al. | |
| 4,574,304 A | 3/1986 | Watanabe et al. | |
| 4,613,904 A | 9/1986 | Lurie | |
| 4,622,583 A | 11/1986 | Watanabe et al. | |
| 4,642,685 A | 2/1987 | Roberts et al. | |
| 4,644,393 A | 2/1987 | Smith et al. | |
| 4,647,964 A | 3/1987 | Weinblatt | |
| 4,697,209 A | 9/1987 | Kiewit et al. | |
| 4,723,302 A | 2/1988 | Fulmer et al. | |
| 4,764,808 A | 8/1988 | Solar | |
| 4,769,697 A | 9/1988 | Gilley et al. | |
| 4,779,198 A | 10/1988 | Lurie | |
| 4,800,437 A | 1/1989 | Hosoya | |
| 4,807,031 A | 2/1989 | Broughton et al. | |
| 4,876,736 A | 10/1989 | Kiewit | |
| 4,885,632 A | 12/1989 | Mabey et al. | |
| 4,907,079 A | 3/1990 | Turner et al. | |
| 4,912,552 A | 3/1990 | Allison, III et al. | |
| 4,931,865 A | 6/1990 | Scarampi | |
| 4,943,963 A | 7/1990 | Waechter et al. | |
| 4,965,825 A | 10/1990 | Harvey et al. | |
| 4,972,503 A | 11/1990 | Zurlinden | |
| 5,097,328 A | 3/1992 | Boyette | |
| 5,136,644 A | 8/1992 | Audebert et al. | |
| 5,165,069 A | 11/1992 | Vitt et al. | |
| 5,226,177 A | 7/1993 | Nickerson | |
| 5,235,414 A | 8/1993 | Cohen | |
| 5,251,324 A | 10/1993 | McMullan, Jr. | |
| 5,310,222 A | 5/1994 | Chatwin et al. | |
| 5,319,453 A | 6/1994 | Copriviza et al. | |
| 5,335,277 A | 8/1994 | Harvey et al. | |
| 5,355,161 A | 10/1994 | Bird et al. | |
| 5,398,055 A | 3/1995 | Nonomura et al. | |
| 5,404,161 A | 4/1995 | Douglass et al. | |
| 5,404,172 A | 4/1995 | Berman et al. | |
| 5,408,258 A | 4/1995 | Kolessar | |
| 5,425,100 A | 6/1995 | Thomas et al. | |
| 5,481,294 A | 1/1996 | Thomas et al. | |
| 5,483,276 A | 1/1996 | Brooks et al. | |
| 5,488,408 A | 1/1996 | Maduzia et al. | |
| 5,505,901 A | 4/1996 | Harney et al. | |
| 5,512,933 A | 4/1996 | Wheatley et al. | |
| 5,550,928 A | 8/1996 | Lu et al. | |
| 5,659,367 A | 8/1997 | Yuen | |
| 5,760,760 A | 6/1998 | Helms | |
| 5,767,922 A | 6/1998 | Zabih et al. | |
| 5,771,307 A | 6/1998 | Lu et al. | |
| 5,801,747 A | 9/1998 | Bedard | |
| 5,874,724 A | 2/1999 | Cato | |
| 5,889,548 A | 3/1999 | Chan | |
| 5,896,554 A | 4/1999 | Itoh | |
| 5,963,844 A | 10/1999 | Dail | |
| 6,035,177 A | 3/2000 | Moses et al. | |
| 6,049,286 A | 4/2000 | Forr | |
| 6,124,877 A | 9/2000 | Schmidt | |
| 6,137,539 A | 10/2000 | Lownes et al. | |
| 6,154,548 A | 11/2000 | Bizzan | |
| 6,175,634 B1 | 1/2001 | Graumann | |
| 6,177,931 B1 | 1/2001 | Alexander et al. | |
| 6,184,918 B1 | 2/2001 | Goldschmidt Iki et al. | |
| 6,286,140 B1 | 9/2001 | Ivanyi | |
| 6,297,859 B1 | 10/2001 | George | |
| 6,311,214 B1 | 10/2001 | Rhoads | |
| 6,388,662 B2 | 5/2002 | Narui et al. | |
| 6,400,996 B1 | 6/2002 | Hoffberg et al. | |
| 6,457,010 B1 | 9/2002 | Eldering et al. | |
| 6,463,413 B1 | 10/2002 | Applebaum et al. | |
| 6,467,089 B1 | 10/2002 | Aust et al. | |
| 6,477,508 B1 | 11/2002 | Lazar et al. | |
| 6,487,719 B1 | 11/2002 | Itoh et al. | |
| 6,519,769 B1 | 2/2003 | Hopple et al. | |
| 6,523,175 B1 | 2/2003 | Chan | |
| 6,529,212 B2 | 3/2003 | Miller et al. | |
| 6,542,878 B1 | 4/2003 | Heckerman et al. | |
| 6,567,978 B1 | 5/2003 | Jarrell | |
| 6,570,559 B1 | 5/2003 | Oshima | |
| 6,647,212 B1 | 11/2003 | Toriumi et al. | |
| 6,647,548 B1 | 11/2003 | Lu et al. | |
| 6,675,383 B1 * | 1/2004 | Wheeler et al. | 725/19 |
| 6,681,396 B1 | 1/2004 | Bates et al. | |
| 6,791,472 B1 | 9/2004 | Hoffberg | |
| 6,934,508 B2 | 8/2005 | Ceresoli et al. | |
| 6,946,803 B2 | 9/2005 | Moore | |
| 7,051,352 B1 | 5/2006 | Schaffer | |
| 7,100,181 B2 | 8/2006 | Srinivasan et al. | |
| 7,150,030 B1 | 12/2006 | Eldering et al. | |
| 7,712,114 B2 | 5/2010 | Ramaswamy | |
| 8,108,888 B2 | 1/2012 | Ramaswamy | |
| 2002/0012353 A1 | 1/2002 | Gerszberg et al. | |
| 2002/0015112 A1 | 2/2002 | Nagakubo et al. | |
| 2002/0026635 A1 | 2/2002 | Wheeler et al. | |
| 2002/0056087 A1 | 5/2002 | Berezowski et al. | |
| 2002/0057893 A1 | 5/2002 | Wood et al. | |
| 2002/0059577 A1 | 5/2002 | Lu et al. | |
| 2002/0072952 A1 | 6/2002 | Hamzy et al. | |
| 2002/0077880 A1 | 6/2002 | Gordon et al. | |
| 2002/0080286 A1 | 6/2002 | Dagtas et al. | |
| 2002/0083435 A1 | 6/2002 | Blasko et al. | |
| 2002/0141730 A1 | 10/2002 | Haken | |
| 2002/0174425 A1 | 11/2002 | Markel et al. | |
| 2002/0198762 A1 | 12/2002 | Donato | |
| 2003/0046685 A1 | 3/2003 | Srinivasan et al. | |
| 2003/0054757 A1 | 3/2003 | Kolessar et al. | |
| 2003/0056215 A1 | 3/2003 | Kanungo | |
| 2003/0067459 A1 | 4/2003 | Lim | |
| 2003/0093790 A1 | 5/2003 | Logan et al. | |
| 2003/0101449 A1 | 5/2003 | Bentolila et al. | |
| 2003/0110485 A1 | 6/2003 | Lu et al. | |
| 2003/0115591 A1 | 6/2003 | Weissmueller, Jr. et al. | |
| 2003/0131350 A1 | 7/2003 | Peiffer et al. | |
| 2003/0216120 A1 | 11/2003 | Ceresoli et al. | |
| 2004/0003394 A1 | 1/2004 | Ramaswamy | |
| 2004/0055020 A1 | 3/2004 | Delpuch | |
| 2004/0058675 A1 | 3/2004 | Lu et al. | |
| 2004/0073918 A1 | 4/2004 | Ferman et al. | |
| 2004/0088212 A1 | 5/2004 | Hill | |
| 2004/0088721 A1 | 5/2004 | Wheeler et al. | |
| 2004/0100437 A1 | 5/2004 | Hunter et al. | |
| 2004/0210922 A1 | 10/2004 | Peiffer et al. | |
| 2005/0054285 A1 | 3/2005 | Mears et al. | |
| 2005/0057550 A1 | 3/2005 | George | |
| 2005/0125820 A1 | 6/2005 | Nelson et al. | |
| 2005/0221774 A1 | 10/2005 | Ceresoli et al. | |
| 2005/0286860 A1 | 12/2005 | Conklin | |
| 2006/0075421 A1 | 4/2006 | Roberts et al. | |
| 2006/0093998 A1 | 5/2006 | Vertegaal | |
| 2006/0195857 A1 | 8/2006 | Wheeler et al. | |
| 2006/0212895 A1 | 9/2006 | Johnson | |
| 2006/0232575 A1 | 10/2006 | Nielsen | |
| 2007/0063850 A1 | 3/2007 | Devaul et al. | |
| 2007/0186228 A1 | 8/2007 | Ramaswamy et al. | |
| 2007/0192782 A1 | 8/2007 | Ramaswamy | |
| 2008/0028427 A1 | 1/2008 | Nesvadba et al. | |
| 2008/0148307 A1 | 6/2008 | Nielsen et al. | |
| 2008/0276265 A1 | 11/2008 | Topchy et al. | |
| 2010/0172407 A1 | 7/2010 | Ramaswamy | |

FOREIGN PATENT DOCUMENTS

| | | |
|---|---|---|
| EP | 0283570 A2 | 9/1988 |
| EP | 0593202 | 4/1994 |

(56) References Cited

FOREIGN PATENT DOCUMENTS

| | | |
|---|---|---|
| EP | 0946012 | 9/1999 |
| EP | 1318679 | 11/2003 |
| GB | 1574964 | 9/1980 |
| JP | 8331482 | 12/1996 |
| JP | 2000307520 | 11/2000 |
| WO | 9115062 | 10/1991 |
| WO | 9512278 | 5/1995 |
| WO | 9526106 | 9/1995 |
| WO | 9810539 | 3/1998 |
| WO | 9832251 | 7/1998 |
| WO | 9933206 | 7/1999 |
| WO | 9959275 | 11/1999 |
| WO | 0038360 | 6/2000 |
| WO | 0072484 | 11/2000 |
| WO | 0111506 | 2/2001 |
| WO | 0145103 | 6/2001 |
| WO | 0161892 | 8/2001 |
| WO | 0219581 | 3/2002 |
| WO | 02052759 | 7/2002 |
| WO | 03049339 | 6/2003 |
| WO | 03052552 | 6/2003 |
| WO | 03060630 | 7/2003 |
| WO | 2005032145 | 4/2005 |
| WO | 2005038625 | 4/2005 |
| WO | 2005041166 | 5/2005 |
| WO | 2005055601 | 6/2005 |
| WO | 2005065159 | 7/2005 |
| WO | 2005079457 | 9/2005 |
| WO | 2006012629 | 2/2006 |
| WO | 2007120518 | 10/2007 |

OTHER PUBLICATIONS

USPTO, "Final Office Action," issued in connection with U.S. Appl. No. 11/388,555, on Oct. 6, 2008 (10 pages).
USPTO, "Advisory Action," issued in connection with U.S. Appl. No. 11/388,555, on Jan. 13, 2009 (3 pages).
USPTO, "Office Action," issued in connection with U.S. Appl. No. 11/388,555, on Mar. 31, 2009 (10 pages).
USPTO, "Final Office Action," issued in connection with U.S. Appl. No. 11/388,555, on Dec. 8, 2009 (12 pages).
USPTO, "Advisory Action," issued in connection with U.S. Appl. No. 11/388,555, on Mar. 22, 2010 (3 pages).
USPTO, "Notice of Allowance," issued in connection with U.S. Appl. No. 11/388,555, on May 20, 2010 (4 pages).
USPTO, "Office Action," issued in connection with U.S. Appl. No. 11/388,262, on Mar. 5, 2009 (10 pages).
USPTO, "Final Office Action," issued in connection with U.S. Appl. No. 11/388,262, on Sep. 2, 2009 (13 pages).
USPTO, "Advisory Action," issued in connection with U.S. Appl. No. 11/388,262, on Jan. 7, 2010 (3 pages).
USPTO, "Office Action," issued in connection with U.S. Appl. No. 11/388,262, on Apr. 28, 2010 (12 pages).
USPTO, "Final Office Action," issued in connection with U.S. Appl. No. 11/388,262, on Oct. 12, 2010 (12 pages).
USPTO, "Office Action," issued in connection with U.S. Appl. No. 11/672,706, on Jul. 23, 2009 (7 pages).
USPTO, "Notice of Allowance," issued in connection with U.S. Appl. No. 11/672,706, on Dec. 31, 2009 (6 pages).
USPTO, "Notice of Allowance," issued in connection with U.S. Appl. No. 12/725,018, on Jun. 27, 2011 (8 pages).
USPTO, "Notice of Allowance," issued in connection with U.S. Appl. No. 12/725,018, on Sep. 28, 2011 (7 pages).
USPTO, "Office Action," issued in connection with U.S. Appl. No. 11/576,328, on Feb. 5, 2009 (14 pages).
USPTO, "Office Action," issued in connection with U.S. Appl. No. 11/576,328, on Aug. 7, 2009 (11 pages).
USPTO, "Notice of Allowance," issued in connection with U.S. Appl. No. 11/576,328, on Apr. 7, 2010 (8 pages).
"Lecture 3; Naive B ayes Classification," http://www.cs.utoronto.ca/~strider/CSCD11_f08/NaiveBayes_Zemel.pdf [Retrieved from the Internet on Feb. 29, 2008] (9 pages).

"Learning Bayesian Networks: Naïve and non-Naïve Bayes" Oregon State University, Oregon [Retrieved from the Internet on Feb. 29, 2008]. Retrieved from the Internet: http://web.engr.oregonstate.edu/~tgd/classess/534/slides/part6.pdf (18 pages).
"The Naïve Bayes Classifier," CS534-Machine Learning, Oregon State University, Oregon [Retrieved from the Internet on Feb. 29, 2008]. Retrieved from the Internet: http://web.engr.oregonstate.edu/~afern/classes/cs534/notes/Naivebayes-10.pdf (19 pages).
"Bayesian Networks," Machine Learning A, 708.064 07W 1sst KU Oregon State University, Oregon [Retrieved from the Internet on Feb. 29, 2008]. Retrieved from the Internet: http://www.igi.tugraz.at.lehre/MLA/WS07/slides3.pdf (21 pages).
Dai et al., "Transferring Naive Bayes Classifiers for Text Classification," Proceedings of the Twenty-Second AAAI Conference on Artificial Intelligence, held in Vancouver, British Columbia on Jul. 22-26, 2007 (6 pages).
Domingos et al., "On the Optimality of the Simple Bayesian Classifier under Zero-One Loss," Machine Learning, vol. 29, No. 2, pp. 103-130, Nov. 1, 1997 (28 pages).
Elkan, Charles, "Naive Bayesian Learning," Adapted from Technical Report No. CS97-557, Department of Computer Science and Engineering, University of California, San Diego, U.S.A., Sep. 1997 (4 pages).
Klein, Dan, "PowerPoint Presentation of 'Lecture 23: Naive Bayes,'" CS 188: Artificial Intelligence held on Nov. 15, 2007 (6 pages).
Lang, Marcus, "Implementation on Naive Bayesian Classifiers in Java," http://www.iit.edu/~ipro356f03/ipro/documents/naive-bayes.edu [Retrieved from the Internet on Feb. 29, 2008] (4 pages).
Liang et al., "Learning Naive Bayes Tree for Conditional Probability Estimation," Proceedings of the Canadian A1-2006 Conference, held in Quebec, Canada, pp. 456-466, on Jun. 7-9, 2006 (13 pages).
Lu et al., "Content Analysis for Audio Classification and Segmentation," IEEE Transactions on Speech and Audio Processing, vol. 10, No. 7, Oct. 2002 (14 pages).
Mitchell, Tom M., "Chapter 1; Generative and Discriminative Classifiers: Naive Bayes and Logistic Regression," Machine Learning, Sep. 21, 2006 (17 pages).
Mozina et al., "Nomograms for Visualization of Naive Bayesian Classifier," Proceedings of the Eight European Conference on Principles and Practice of Knowledge Discovery in Databases, held in Pisa, Italy, pp. 337-348, 2004 [Retrieved from the Internet on Feb. 29, 2008] (12 pages).
Patron-Perez et al., "A Probabilistic Framework for Recognizing Similar Actions using Spatio-Temporal Features," BMVC07, 2007 [Retrieved from the Internet on Feb. 29, 2008] (10 pages).
The Peltarion Blog, "Synaptic," Jul. 10, 2006 [Retrieved from the Internet on Mar. 11, 2009] Retrieved from the Internet: http//blog.peltarion.com/2006/07/10/classifier-showdown (14 pages).
"Logical Connective: Philosophy 103: Introduction to Logic Conjunction, Negation, and Disjunction," [Retrieved from the Internet on 200-03-11] Retrieved from the Internet: http://philosophy.lander.edu/logic/conjunct.html (5 pages).
Smith, Leslie S., "Using IIDs to Estimate Sound Source Direction," Proceedings of the Seventh International Conference on Simulation of Adaptive Behavior on from Animals to Animats, pp. 60-61, 2002 (2 pages).
Thomas, "Television Audience Research Technology, Today's Systems and Tomorrow's Challenges," IEEE 1992, (4 pages).
Vincent et al., "A Tentative Typology of Audio Source Separation Tasks," $4^{th}$ International Symposium on Independent Component Analysis and Blind Signal Separation (ICA 2003), held in Nara, Japan, Apr. 2003 (6 pages).
Wikipedia, "Naive Bayes Classifier," entry as of Mar. 11, 2009 [Retrieved from the Internet on Mar. 11, 2009] (7 pages).
Wikipedia, "Naive Bayes Classifier," entry as of Jan. 11, 2008 [Retrieved from the Internet from Wikipedia history pages on Mar. 11, 2009] (7 pages).
Zhang, Harry, "The Optimality of Naive Bayes," Proceedings of the Seventeenth International FLAIRS Conference, 2004 (6 pages).
Zimmerman, H., "Fuzzy set applications in pattern recognition and data-analysis," 11th IAPR International conference on Pattern Recognition, Aug. 29, 1992 (81 pages).

(56) References Cited

OTHER PUBLICATIONS

IP Australia, "Examiner's First Report," issued in connection with Australian Patent Application No. 2005273948, dated May 22, 2009 (2 pages).
IP Australia, "Examiner's First Report," issued in connection with Australian Patent Application No. 2010201753, dated Mar. 23, 2011 (2 pages).
IP Australia, "Notice of Allowance," issued in connection with Australian Patent Application No. 2010201753, dated Apr. 17, 2012 (3 pages).
IP Australia, "Examiner's First Report," issued in connection with Australian Patent Application No. 2010219320, dated Jun. 20, 2012 (4 pages).
CIPO, "Office Action," issued in connection with Canadian Patent Application No. 2,576,865, mailed Mar. 29, 2010 (5 pages).
CIPO, "Office Action," issued in connection with Canadian Patent Application No. 2,576,865, mailed Jun. 17, 2011 (3 pages).
EPO, "Extended European Search Report" issued in connection with European Patent Application No. 05798239.9, mailed Sep. 9, 2008 (4 pages).
EPO, "Communication Pursuant to Article 94(3) EPC," issued in connection with European Patent Application No. 05798239.9, mailed Dec. 8, 2009 (5 pages).
EPO, "Communication Pursuant to Article 94(3) EPC," issued in connection with European Patent Application No. 05798239.9, mailed Dec. 27, 2010 (4 pages).
EPO, "Summons to Attend Oral Proceedings Pursuant to Rule 115(1) EPC," issued in connection with European Patent Application No. 05798239.9, mailed Dec. 22, 2011 (3 pages).
EPO, "Communication Pursuant to Rule 62a(1) EPC and Rule 63(1) EPC," issued in connection with European Patent Application No. 11009958.7, mailed Mar. 27, 2012 (3 pages).
KIPO, "Notice of Preliminary Rejection," issued in connection with Korean Patent Application No. 10-2007-7005373, mailed Oct. 31, 2011 (5 pages).
KIPO, "Notice of Preliminary Rejection," issued in connection with Korean Patent Application No. 10-2007-7005373, mailed May 30, 2012 (5 pages).
Mexican Patent Office, "Official Action (with English Language Translation)," issued in connection with Mexican Patent Application No. MX/a/2007/001734, dated Jul. 24, 2009 (6 pages).
Intellectual Property Office of New Zealand, "Examination Report," issued in connection with New Zealand Patent Application No. 553385, mailed Oct. 17, 2008 (2 pages).
Intellectual Property Office of New Zealand, "Examination Report," issued in connection with New Zealand Patent Application No. 553385 mailed Nov. 18, 2009 (2 pages).
PCT, "International Search Report," issued in connection with PCT Application No. PCT/US2003/030370, mailed Mar. 11, 2004 (7 pages).
PCT, "Written Opinion," issued in connection with PCT Application No. PCT/US2003/030370, mailed Nov. 13, 2004 (5 pages).
PCT, "International Preliminary Report on Patentability," issued in connection with PCT Application No. PCT/US2003/030370, mailed Mar. 7, 2005 (3 pages).
PCT, "International Search Report," issued in connection with PCT Application No. PCT/US2003/030355, mailed May 5, 2004 (6 pages).
PCT, "Written Opinion," issued in connection with PCT Application No. PCT/US2003/030355, mailed Mar. 21, 2008 (5 pages).
PCT, "International Preliminary Report on Patentability," issued in connection with PCT Application No. PCT/US2003/030355, mailed Mar. 28, 2011 (5 pages).
PCT, "International Search Report and Written Opinion," issued in connection with PCT Application No. PCT/US2005/028106, mailed Mar. 12, 2007 (11 pages).
PCT, "International Preliminary Report on Patentability," issued in connection with PCT Application No. PCT/US2005/028106, mailed Mar. 27, 2007 (4 pages).
PCT, "International Search Report and Written Opinion," issued in connection with PCT Application No. PCT/US2006/031960, mailed Feb. 21, 2007 (5 pages).
PCT, "International Preliminary Report on Patentability," issued in connection with PCT Application No. PCT/US2006/031960, mailed Feb. 20, 2008 (4 pages).
Intellectual Property Office of Singapore, "Written Opinion," issued in connection with Singapore Patent Application No. 200700990-5, dated Jun. 23, 2009 (4 pages).
SIPO, "First Notification of Office Action," issued in connection with Chinese Patent Application No. 20058003020.X, dated Jun. 5, 2009 (11 pages).
SIPO, "Rejection Decision," issued in connection with Chinese Patent Application No. 200580030202.X, dated Mar. 24, 2011 (9 pages).
Tsekeridou et al., "Content-Based Video Parsing and Indexing Based on Audio-Visual Interaction," IEEE Transactions on Circuits and Systems for Video Technology, vol. 11 No. 4, Apr. 1, 2001, pp. 522-535.
Extended European Search Report, issued by the European Patent Office in connection with European Patent Application No. 11009958.7, on Jul. 18, 2012, 10 pages.
European Examination Report, issued by the European Patent Office in connection with European Patent Application No. 11009958.7, on Mar. 20, 2013, 4 pages.
Notice of Allowance, issued by the Korean Intellectual Property Office in connection with Korean Patent Application No. 10-2007-7005373, on Dec. 24, 2012, 3 pages.
Notice of Allowance, issued by the Canadian Intellectual Property Office in connection with Canadian Patent Application No. 257865, on Oct. 2, 2012, 1 page.
Notice of Allowance, issued by the State Intellectual Property Office of China P.R. in connection with Chinese Patent Application No. 200580030202.X, on Jun. 21, 2013, 5 pages.
Fourth Office Action, issued by the State Intellectual Property Office of China P.R. in connection with Chinese Patent Application No. 200580030202.X, on Mar. 18, 2013, 6 pages.
State Intellectual Property Office of China, "Office Action," issued in connection with Chinese Application No. 201110288875.2, dated Oct. 30, 2013, and corresponding English translation, 8 pages.

* cited by examiner

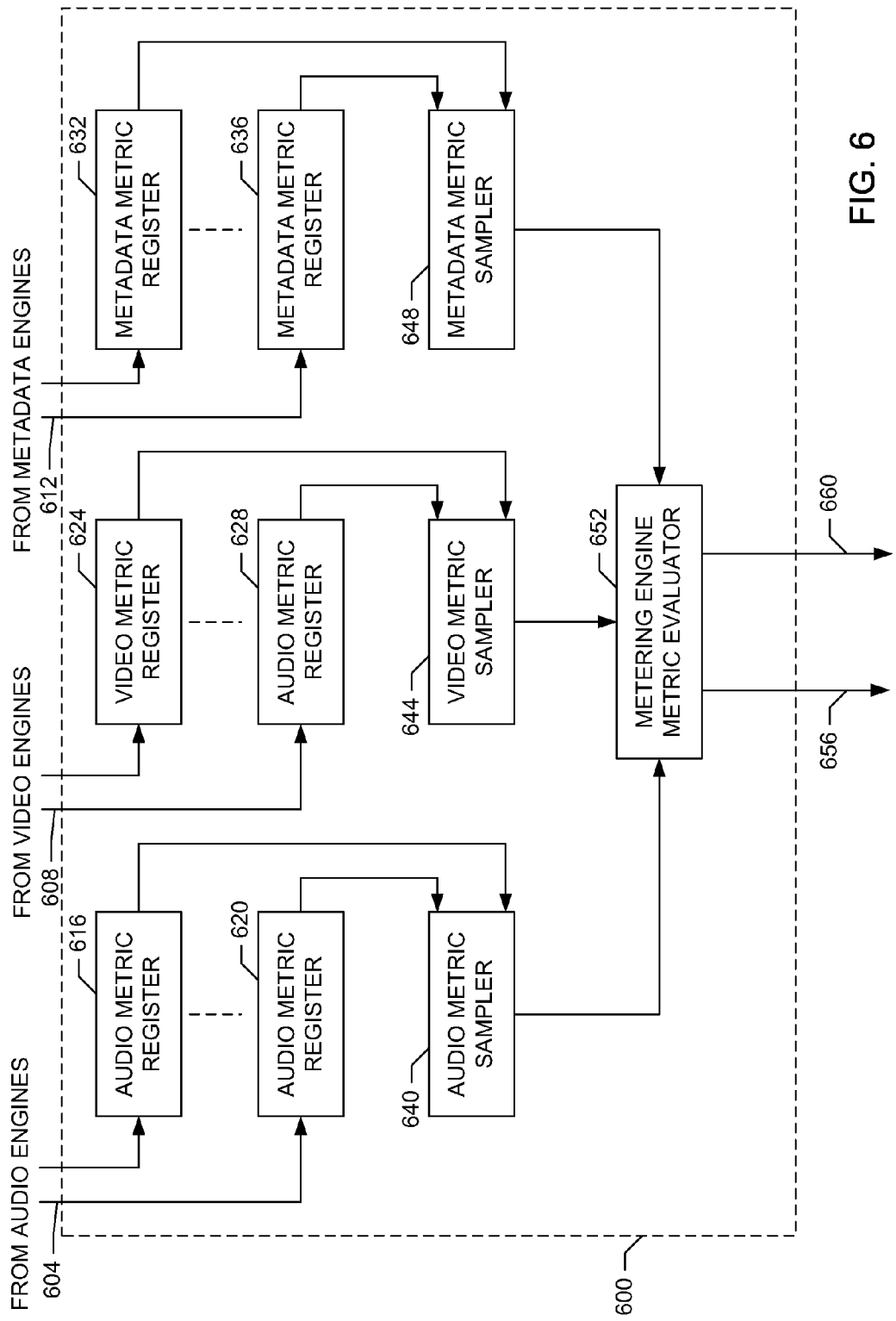

| Class | Source | Decision Metric |
|---|---|---|
| Analog | Analog TV Live | 1) Metric 1<br>   a) AMOL line 20 present<br>   b) No timeshift<br>2) Metric 2<br>   a) No AMOL line 20 present<br>   b) No audio mute<br>   c) Cable spectral shaping<br>   d) No timeshift |
| Analog | Analog VOD | 1) Metric 1<br>   a) AMOL line 20 present<br>   b) Timeshift<br>   c) Cable spectral shaping<br>2) Metric 2<br>   a) No AMOL line 20 present<br>   b) No audio mute<br>   c) Cable spectral shaping<br>   d) Timeshift |

FIG. 16A

| Class | Source | Decision Metric |
|---|---|---|
| Analog | VCR Playback | 1) Metric 1<br>   a) AMOL line 20 present<br>   b) Timeshift<br>   c) No cable spectral shaping<br>2) Metric 2<br>   a) No AMOL line 20 present<br>   b) No audio mute<br>   c) No cable spectral shaping<br>   d) No macroblock<br>   e) No AC3<br>   f) No MPEG audio |
| Digital | DVD Playback | 1) Metric<br>   a) No AMOL line 20 present<br>   b) No audio mute<br>   c) Macroblock<br>   d) AC3 |

FIG. 16B

| Class | Source | Decision Metric |
|---|---|---|
| Digital | Digital TV Live | 1) Metric<br><br>   a) No AMOL line 20 present<br><br>   b) No audio mute<br><br>   c) No cable spectral shaping<br><br>   d) No macroblock<br><br>   e) AC3<br><br>   f) No timeshift |
| Digital | Digital TV DVR Playback | 1) Metric<br><br>   a) No AMOL line 20 present<br><br>   b) No audio mute<br><br>   c) No cable spectral shaping<br><br>   d) No macroblock<br><br>   e) AC3<br><br>   f) Timeshift |

FIG. 16C

| Class | Source | Decision Metric |
|---|---|---|
| Digital | MPEG DVR Live | 1) Metric<br><br>   a) No AMOL line 20 present<br><br>   b) No audio mute<br><br>   c) No cable spectral shaping<br><br>   d) No macroblock<br><br>   e) MPEG audio<br><br>   f) No timeshift |
| Digital | MPEG DVR Playback | 1) Metric<br><br>   a) No AMOL line 20 present<br><br>   b) No audio mute<br><br>   c) No cable spectral shaping<br><br>   d) No macroblock<br><br>   e) MPEG audio<br><br>   f) Timeshift |

FIG. 16D

| Class | Source | Decision Metric |
|---|---|---|
| Digital | Video Game | 1) Metric<br>   a) No AMOL line 20 present<br>   b) No audio mute<br>   c) Macroblock = 0 |
| Special Operating Mode | Blank Frame (last detected source credited) | 1) Metric<br>   a) Blank frame detected |
| Special Operating Mode | Audio Mute (last detected source credited) | 1) Metric<br>   a) Audio mute detected<br>   b) Closed caption or teletext present (optional) |

FIG. 16E

| Class | Source | Decision Metric |
|---|---|---|
| Special Operating Mode | Menu Display | 1) Metric<br>   a) Audio mute detected (optional)<br>   b) No closed caption or teletext (optional)<br>   c) Pause detected<br>   d) Template, jingle and/or text match |
| Special Operating Mode | Pause (last detected source credited) | 1) Metric<br>   a) Audio mute detected<br>   b) No closed caption or teletext<br>   c) Pause detected<br>   d) No template and/or text match |
| Special Operating Mode | Trick mode (last detected source credited) | 1) Metric<br>   a) Audio mute detected<br>   b) No closed caption or teletext<br>   c) No pause or blank frame |

FIG. 16F

METHODS AND APPARATUS TO MONITOR AUDIO/VISUAL CONTENT FROM VARIOUS SOURCES

RELATED APPLICATIONS

This patent is a continuation of U.S. patent application Ser. No. 12/725,018, entitled "Methods and Apparatus to Monitor Audio/Visual Content from Various Sources," which was filed on Mar. 16, 2010, which is a continuation of U.S. patent application Ser. No. 11/672,706 (now U.S. Pat. No. 7,712,114), entitled "Methods and Apparatus to Monitor Audio/Visual Content from Various Sources," which was filed on Feb. 8, 2007, which is a continuation of International Application Serial Number PCT/US2005/028106, entitled "Methods and Apparatus to Monitor Audio/Visual Content from Various Sources," which was filed on Aug. 9, 2005, which claims priority from U.S. Provisional Application Ser. No. 60/600,007, entitled "Methods and Apparatus to Monitor Audio/Visual Content from Various Sources," which was filed on Aug. 9, 2004. U.S. patent application Ser. No. 12/725,018, U.S. Patent Application Serial No. 11/672,706, International Application Serial Number PCT/US2005/028106 and U.S. Provisional Application Ser. No. 60/600,007 are hereby incorporated by reference in their respective entireties.

FIELD OF THE DISCLOSURE

This disclosure relates generally to audience measurement and, more particularly, to methods and apparatus to monitor audio/visual content from various sources.

BACKGROUND

Television ratings and metering information is typically generated by collecting viewing records and/or other viewing information from a group of statistically selected households. Each of the statistically selected households typically has a data logging and processing unit commonly referred to as a "home unit." In households having multiple viewing sites (e.g., multiple television systems), the data logging and processing functionality may be distributed among a single home unit and multiple "site units," one site unit for each viewing site. The home unit (or the combination of the home unit and the site unit) is often in communication with a variety of attachments that provide inputs to the home unit or receive outputs from the home unit. For example, a source identification unit such as a frequency detector attachment may be in communication with a television to sense a local oscillator frequency of the television tuner. In this manner, the frequency detector attachment may be used to determine to which channel the television is currently tuned based on a detected frequency. Additional source identification devices, such as on-screen readers and light-emitting-diode (LED) display readers, may be provided, for example, to determine if the television is operating (i.e., is turned ON) and/or the channel to which the television is tuned. A people counter may be located in the viewing space of the television and in communication with the home unit, thereby enabling the home unit to detect the identities and/or number of persons currently viewing programs displayed on the television.

The home unit usually processes the inputs (e.g., channel tuning information, viewer identities, etc.) from the attachments to produce viewing records. Viewing records may be generated on a periodic basis (e.g., at fixed time intervals) or on an a-periodic basis (e.g., in response to one or more predetermined events, such as a full memory, or a change in an input, such as a change in the identities of the persons viewing the television, a change in the channel tuning information (i.e., a channel change)), etc. Each viewing record typically contains channel information, such as a channel number and/or station identification (ID), and a time (e.g., a date and time-of-day) at which the channel was displayed. In cases in which the program content being displayed is associated with a local audio/video content delivery device, such as a digital versatile disk (DVD) player (also known as a digital video disk player), a digital video recorder (DVR), a video cassette recorder (VCR), etc., the viewing records may include content identification (i.e., program identification) information as well as information relating to the time and manner in which the associated content was displayed. Viewing records may also contain additional information, such as the number of viewers present at the viewing time.

The home unit typically collects a quantity of viewing records and periodically (e.g., daily) transmits the collected viewing records to a central office or data processing facility for further processing or analysis. The central data processing facility receives viewing records from home units located in some or all of the statistically selected households and analyzes the viewing records to ascertain the viewing behaviors of households in a geographic area or market of interest, a particular household and/or a particular group of households selected from all participating households. Additionally, the central data processing facility may generate metering statistics and other parameters indicative of viewing behavior associated with some or all of the participating households. This data may be extrapolated to reflect the viewing behaviors of markets and/or regions modeled by the statistically selected households.

To generate viewing behavior information from viewing records, the central office or data processing facility may compare reference data, such as a list of programs (e.g., a schedule of television programming or a television guide), to the viewing records. In this manner, the central office can infer which program was displayed by cross-referencing the time and channel information in a viewing record to the program associated with that same time and channel in the program schedule. Such a cross-referencing process can be carried out for each of the viewing records received by the central office, thereby enabling the central office to reconstruct which programs were displayed by the selected households and the times at which the programs were displayed. Of course, the aforementioned cross-referencing process is unnecessary in systems in which the identity of the program is obtained by the home unit and contained in the viewing record.

The rapid development and deployment of a wide variety of audio/video content delivery and distribution platforms has dramatically complicated the home unit task of providing viewing records or information to the central data collection facility. For instance, while the above-mentioned frequency detector device can be used to detect channel information at a site where network television broadcasts are being displayed (because, under normal operation conditions, the local oscillator frequency corresponds to a known network channel), such a device typically cannot be used with digital broadcast systems. In particular, digital broadcast systems (e.g., satellite-based digital television systems, digital cable systems, etc.) typically include a digital receiver or set-top box at each subscriber site. The digital receiver or set-top box demodulates a multi-program data stream, parses the multi-program data stream into individual audio and/or video data packets, and selectively processes those data packets to generate an audio/video signal for a desired program. The audio and/or video output signals generated by the set-top box can be directly coupled to an audio/video input of an output device (e.g., a television, a video monitor, etc.). As a result, the local oscillator frequency of the output device tuner, if any, does not necessarily identify the channel or program currently being displayed.

To allow generation of meaningful viewing records in cases wherein, for example, the channel tuned by a monitored information presenting device is not readily identifiable or may not uniquely correspond to a displayed program, metering techniques based on the use of ancillary codes and/or content signatures may be employed. Metering techniques that rely on ancillary codes often encode and embed identifying information (e.g., a broadcast/network channel number, a program identification code, a broadcast time stamp, a source identifier to identify a network and/or station providing and/or broadcasting the content, etc.) in the broadcast signal such that the code is not noticed by the viewer. For example, a well-known technique used in television broadcasting involves embedding the ancillary codes in the non-viewable vertical blanking interval (VBI) of the video signal. Another example involves embedding inaudible codes in portions of the audio signal accompanying the broadcast program. This latter technique is especially advantageous because the embedded code may be reproduced by, for example, the television speaker and non-intrusively monitored by an external sensor, such as a microphone.

In general, signature-based program identification techniques use one or more characteristics of the currently displayed (but not yet identified) audio/video content to generate a substantially unique proxy or signature (e.g., a series of digital values, a waveform, etc.) for that content. The signature information for the content being displayed may be compared to a set of reference signatures corresponding to a known set of programs. When a substantial match is found, the currently displayed program content can be identified with a relatively high probability.

Generation of accurate monitoring information is becoming increasingly challenging due to the ongoing trend of incorporating multiple audio/visual content sources into a single household viewing area. For example, a typical home entertainment system may include a cable television or broadcast satellite set-top box with an integrated or separate DVR, a DVD player, a DVD recorder, a VCR, a video game console, etc. To generate accurate monitoring information, the audio/video content source and any associated content identification information must be accurately determined. However, monitoring each possible audio/video content source separately may result in an overly complex and/or cumbersome monitoring system. Also, it is desirable that the monitoring be performed in a way that does not require any after-market modification of the various possible audio/video content sources.

BRIEF DESCRIPTION OF THE DRAWINGS

FIG. 6 is a block diagram of an example decision processor that may be used to implement the example multi-engine meter of FIG. 2.

FIGS. 16A-16F illustrate example decision metrics that may be used by the example decision processor of FIG. 6.

DETAILED DESCRIPTION

Figure 1:
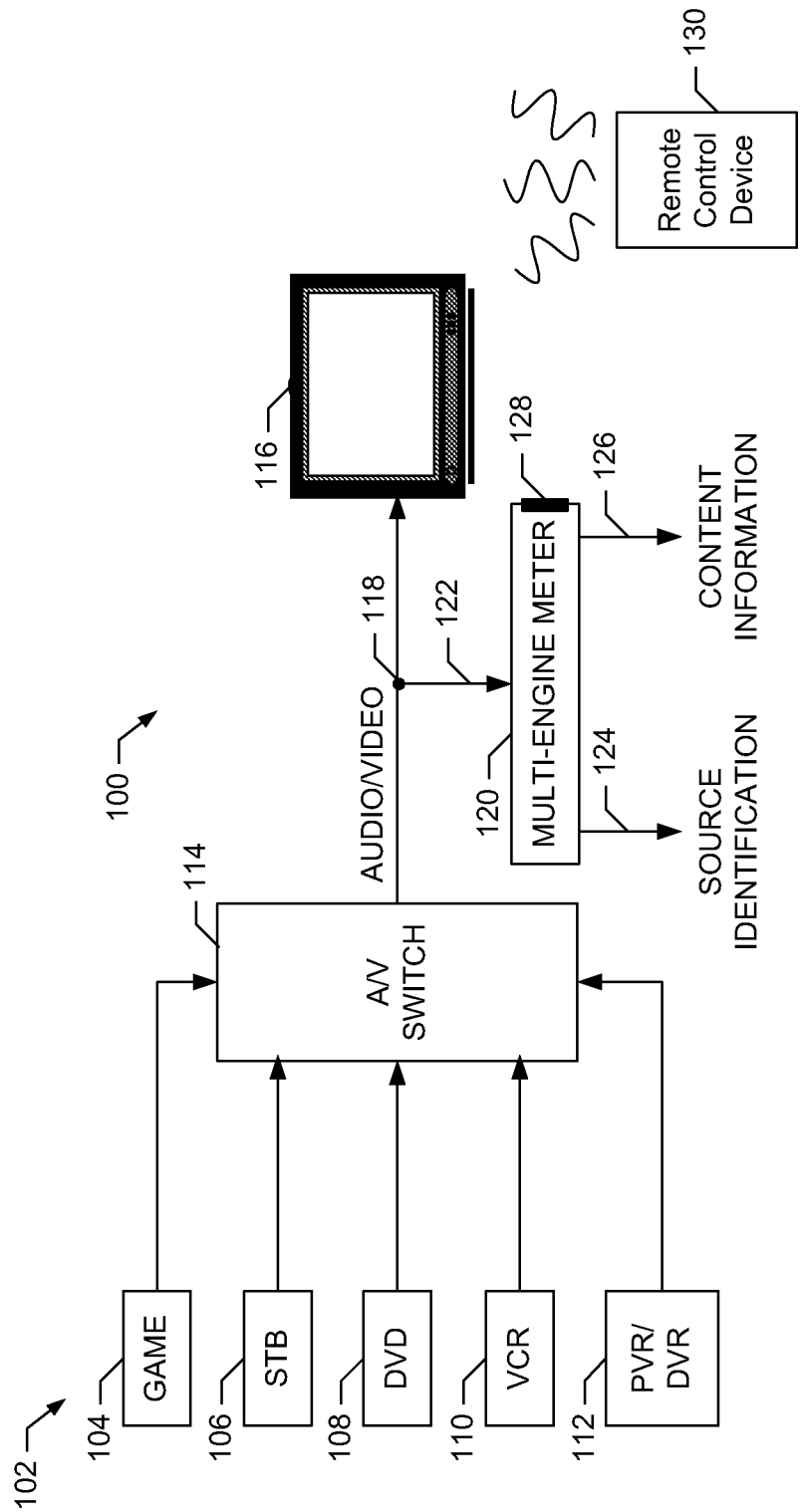
FIG. 1 is a block diagram of an example home entertainment system monitored by an example multi-engine meter.

A block diagram of an example home entertainment system 100 with content monitoring capability is illustrated in FIG. 1. The example home entertainment system 100 includes a plurality of audio/visual (A/V) content sources 102 that may include any or all of a game console 104, a set-top box (STB) 106, a digital video disk (DVD) player 108, a video cassette recorder (VCR) 110, a personal video recorder (PVR), a digital video recorder (DVR) 112, etc. The A/V content sources 102 are coupled to the inputs of an A/V switch 114 to route the outputs from a selected one of the A/V content sources 102 to the inputs of a television 116 or other information presentation device. Additionally, a signal splitter 118 routes the inputs being provided to the television 116 to a multi-engine meter 120 to facilitate monitoring of the A/V content provided to and presented by the television 116. The components of the home entertainment system 100 may be connected in any well-known manner including that shown in FIG. 1.

The game console 104 may be any device capable of playing a video game. An example game console 104 is a standard dedicated game console, such as Microsoft's XBOX, Nintendo's GameCube, Sony's PlayStation, etc. Another example game console 104 is a portable dedicated gaming device, such as Nintendo's GameBoy SP or Game Boy DS, or Sony's PSP. Other example games consoles 104 include a personal digital assistant (PDA), a personal computer, a DVD player, a DVR, a PVR, a cellular/mobile phone, and the like.

The STB 106 may be any set-top box, such as a cable television converter, a direct broadcast satellite (DBS) decoder, an over-the-air (OTA) digital television (DTV) receiver, a VCR, etc. The set-top box 106 receives a plurality of broadcast channels from a broadcast source (not shown). Typically, the STB 106 selects one of the plurality of broadcast channels based on a user input, and outputs one or more signals received via the selected broadcast channel. In the case of an analog signal, the STB 106 tunes to a particular channel to obtain programming delivered on that channel. For a digital signal, the STB 106 may tune to a channel and decode certain packets of data to obtain programming delivered on the selected channel. For example, the STB 106 may tune to a major channel and then extract a program carried on a minor channel within the major channel via the decoding process mentioned above.

The DVD player 108 may be provided, for example, to output A/V content stored in a digital format on a DVD and/or audio content stored in a digital format on a compact disk (CD). The VCR 110 may be provided, for example, to output pre-recorded A/V content stored on a video cassette and/or to record A/V content provided by another of the A/V content sources 102 for later presentation via the television 116. The PVR/DVR 112 may be provided to support time-shifted presentation of the A/V content provided by, for example, the STB 106. The PVR/DVR 112 typically supports a variety of features, including presenting live A/V content, delaying the presentation of live A/V content, fast-forwarding and rewinding A/V content, pausing the presentation of A/V content, recording A/V content for later presentation while watching a live broadcast of other A/V content, etc. A PVR is typically a DVR that has been configured to be automatically adaptive to or otherwise automatically responsive to the viewing preferences of a particular user or group of users within a particular household. For example, many DVRs provide a telephone line connection that enables the DVR to communicate with a central service facility that receives viewer preference information from the DVR and which sends configuration information to the DVR based on those viewer preferences. The configuration information is used by the DVR to automatically configure the DVR to record video programs consistent with the preferences of the viewer or viewers associated with that DVR. TiVo™ is one well-known service that provides PVR functionality to an otherwise standard or conventional DVR.

The A/V switch 114 is configured to route a user-selected A/V input to the switch output. As shown in FIG. 1, the outputs of each of the plurality of A/V content sources 102 are routed to respective inputs of the A/V switch 114. The user may then use the A/V switch 114 to select which of the A/V content sources 102 will be coupled to the television 116. The format of the inputs and output of the A/V switch 114 will depend on the formats of the outputs of the A/V content sources 102 and the inputs of the television 116. For example, the inputs and outputs of the A/V switch 114 may be composite audio/video, component audio/video, RF, etc. Also, as will be recognized by a person of ordinary skill in the art, the A/V switch 114 may be implemented as a stand-alone device or integrated, for example, into a home entertainment receiver, a television or similar device.

An output from the A/V switch 114 is fed to a signal splitter 118, such as a composite audio/video splitter in the case of a direct composite audio/video connection between the A/V switch 114 and the television 116, or a single analog y-splitter in the case of an RF coaxial connection between the A/V switch 114 and the television 116. In the example home entertainment system 100, the signal splitter 118 produces two signals indicative of the output from the A/V switch 114. Of course, a person of ordinary skill in the art will readily appreciate that any number of signals may be produced by the signal splitter 118.

In the illustrated example, one of the two signals from the signal splitter 118 is fed to the television 116 and the other signal is delivered to the multi-engine meter 120. The television 116 may be any type of television or television display device. For example, the television 116 may be a television and/or display device that supports the National Television Standards Committee (NTSC) standard, the Phase Alternating Line (PAL) standard, the Systeme Électronique pour Couleur avec Mémoire (SECAM) standard, a standard developed by the Advanced Television Systems Committee (ATSC), such as high definition television (HDTV), a standard developed by the Digital Video Broadcasting (DVB) Project, a multimedia computer system, etc.

The second of the two signals from the signal splitter 118 (i.e., the signal carried by connection 122 in FIG. 1) is coupled to an input of the multi-engine meter 120. The multi-engine meter 120 is an A/V content monitoring device capable of determining the A/V content source 102 providing the A/V content to the television 116. Such source identification information may be output via a source identification output 124. Additionally, the multi-engine meter 120 may be configured to determine content identification information (also known as tuning information) that may be dependent on the content source, such as a video game title, a broadcast program title, a recorded program title, an original broadcast time, a presentation time, a trickmode in use, etc. Such content identification information may be output via a content information output 126. The multi-engine meter 120 determines the content identification information based on the signal corresponding to the A/V content being output by the A/V switch 114.

To facilitate the determination of source and content identification information, the multi-engine meter 120 may also be provided with one or more sensors 128. For example, one of the sensors 128 may be configured to detect signals transmitted by a remote control device 130. As shown in FIG. 1, the example home entertainment system 100 also includes a remote control device 130 to transmit control information that may be received by any or all of the A/V content sources 102, the television 116 and/or the multi-engine meter 120. One having ordinary skill in the art will recognize that the remote control device 130 may transmit this information using a variety of techniques, including, but not limited to, infrared (IR) transmission, radio frequency transmission, wired/cabled connection, and the like.

Figure 2:
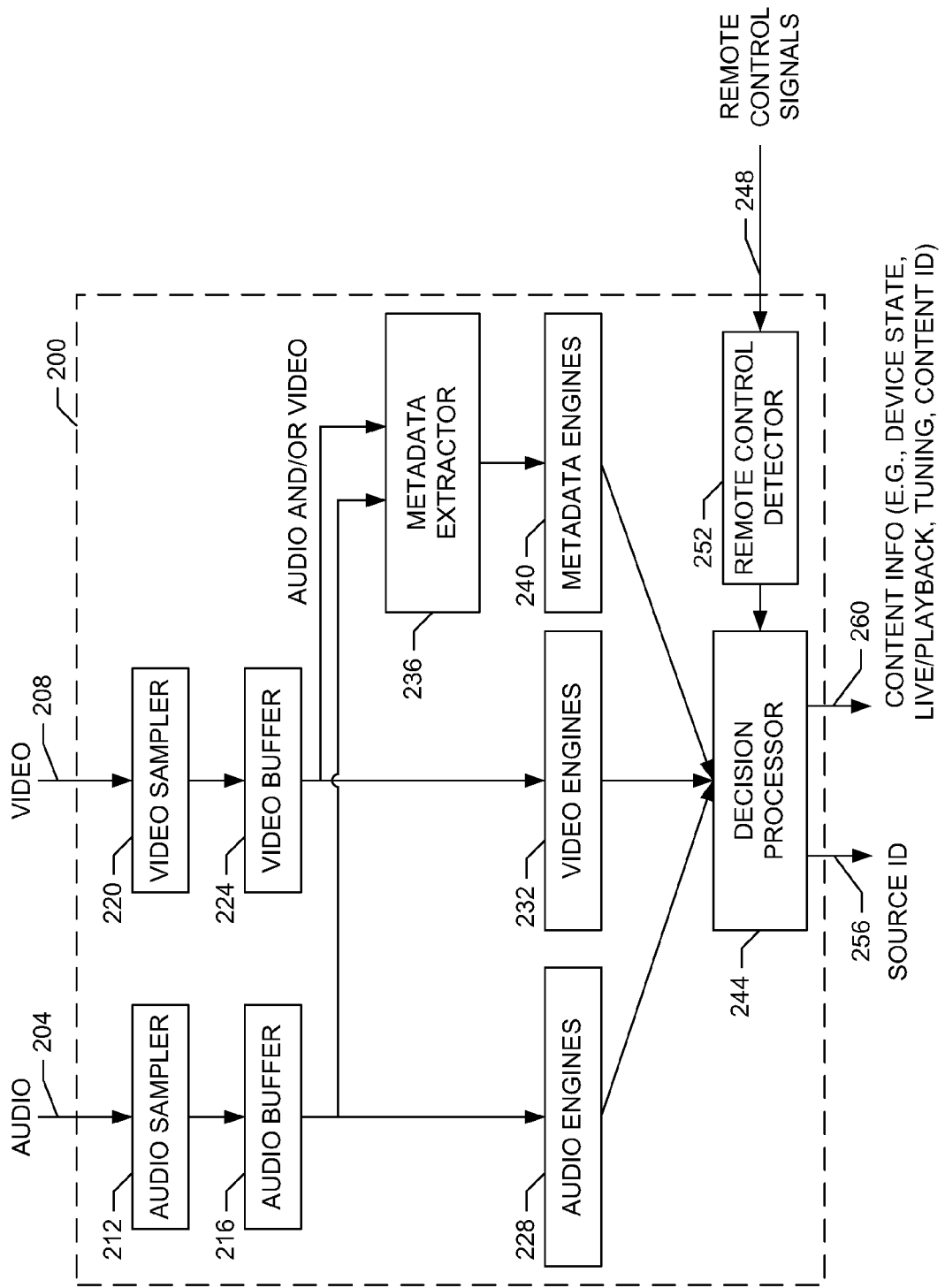
FIG. 2 is a block diagram of an example multi-engine meter that may be used in the example of FIG. 1.

A block diagram of an example multi-engine meter 200 that may be used to implement the multi-engine meter 120 of FIG. 1 is illustrated in FIG. 2. The example multi-engine meter 200 is configured to process composite A/V inputs that include stereo left and right audio input signals 204 and a video input signal 208. The stereo audio input signals 204 are sampled by an audio sampler 212 at a suitable sampling rate, e.g., 48 kHz, and converted to a digital monaural audio signal. The resulting digital audio samples are stored in an audio buffer 216. The video input signal 208 is sampled by a video sampler 220 to form digital video samples that are stored in a video buffer 224. In the instant example, the video sampler 220 and video buffer 224 are configured to sample the video input 208 at an NTSC frame rate of 29.97 frames/sec with a resolution of 640 by 480 pixels. Additionally, the input color video signal is converted to a black-and-white luminance signal. However, a person having ordinary skill in the art will appreciate that various sampling rates, resolutions and color conversions may also be used.

The multi-engine meter 200 includes one or more audio engines 228 to process the digital audio samples stored in the audio buffer 216. The audio engines 228 are configured to determine characteristics of the input audio signals 204 and/or information included in the input audio signals 204 that may be used to ascertain the A/V content source coupled to the multi-engine meter 200 (e.g., which A/V content source 102 of FIG. 1 is coupled to the multi-engine meter 120 and, therefore, the television 116). Additionally, the audio engines 228 may be configured to determine A/V content identification information based on the input audio signals 204. Examples of audio engines 228 are discussed in greater detail below in connection with FIG. 3.

The example multi-engine meter 200 also includes one or more video engines 232 to process the digital video samples stored in the video buffer 224. Similar to the audio engines 228, the video engines 232 are configured to determine characteristics of the input video signal 208 and/or information included in the input video signal 208 that may be used to ascertain the A/V content source coupled to the multi-engine meter 200 (e.g., which A/V content source 102 of FIG. 1 is coupled to the multi-engine meter 120 and, therefore, the television 116). Additionally, the video engines 232 may be configured to determine A/V content identification information based on the input video signal 208. Examples of video engines 232 are discussed in greater detail below in connection with FIG. 4.

To receive, decode and process metadata that may be embedded in the input audio signals 204 and/or input video signal 208, the example multi-engine meter 200 includes a metadata extractor 236 and one or more associated metadata engines 240. The metadata extractor 236 is configured to extract and/or process portions of the input audio signals 204 and/or input video signal 208 that may be used to carry embedded metadata information. The extracted/process signal portions are then processed further by the metadata engines 240 to determine if metadata is present in the signal portions and, if so, to receive/decode such metadata. The resulting metadata may be used to ascertain the A/V content source coupled to the multi-engine meter 200 and/or to determine A/V content information associated with the input signals 204, 208. Examples of metadata engines 240 are discussed in greater detail below in connection with FIG. 5.

The example multi-engine meter 200 includes a decision processor 244 to process the output information generated by the audio engines 228, the video engines 232 and the metadata engines 240. Additionally, the decision processor 244 of the example multi-engine meter 200 is configured to process remote control signals 248 transmitted by a remote control device, such as the remote control device 130 of FIG. 1. The remote control signals 248 are received by a remote control detector 252 and provided as input to the decision processor 244 as shown. The decision processor 244 processes the available input information to determine the A/V content source coupled to the multi-engine meter 200 and outputs this information via the source identification (ID) output 256. Additionally, the decision processor 244 may determine A/V content identification information and output such information via the content information (info) output 260. An example decision processor 244 is discussed in greater detail below in connection with FIG. 6.

Figure 3:
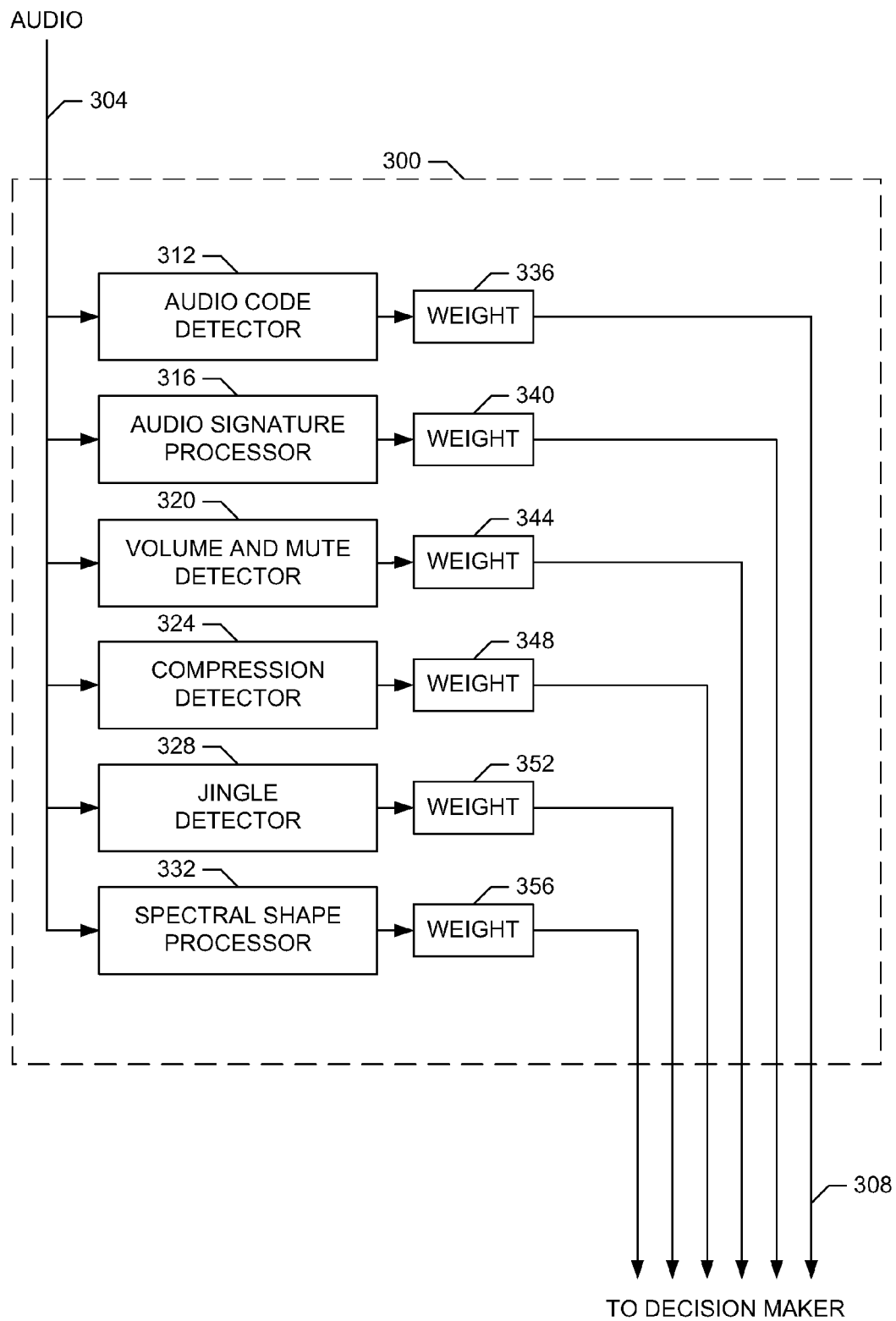
FIG. 3 is a block diagram of an example set of audio engines that may be used to implement the example multi-engine meter of FIG. 2.

An example set of audio engines 300 that may be used to implement the audio engines 228 of FIG. 2 is shown in FIG. 3. The audio engines 300 process input audio samples 304 provided, for example, by the audio buffer 216 of FIG. 2. The input audio samples 304 correspond to an audio signal being output by an A/V content source (e.g., one of the A/V content sources 102 of FIG. 1) and provided as input to a monitored presentation device, such as the television 116. An audio engine included in the audio engines 300 is configured to read a number of input audio samples 304 at a rate and frequency that depends on the processing performed by that particular audio engine. Thus, the audio engines 300 may operate autonomously and read the input audio samples 304 and generate corresponding audio engine outputs 308 in an autonomous fashion.

The example set of audio engines 300 includes an audio code detector 312, an audio signature processor 316, a volume and mute detector 320, a compression detector 324, a jingle detector 328 and a spectral shape processor 332. The example audio code detector 312 is configured to detect and process ancillary audio codes that may be embedded in the audio signal corresponding to the input audio samples 304. As discussed above, ancillary audio codes may be used to encode and embed identifying information (e.g., a broadcast/network channel number, a program identification code, a broadcast time stamp, a source identifier to identify a network and/or station providing and/or broadcasting the content, etc.) in, for example, non-audible portions of the audio signal accompanying a broadcast program. Methods and apparatus for implementing the audio code detector 312 are known in the art. For example, in U.S. Pat. No. 6,272,176, incorporated herein by reference in its entirety, Srinivasan discloses a broadcast encoding system and method for encoding and decoding information transmitted within an audio signal. This and/or any other appropriate technique may be used to implement the audio code detector 312.

The example audio signature processor 316 is configured to generate and process audio signatures corresponding to the input audio samples 304. As discussed above, characteristics of the audio portion of presented A/V content may be used to generate a substantially unique proxy or signature (e.g., a series of digital values, a waveform, etc.) for that content. The signature information for the content being presented may be compared to a set of reference signatures corresponding to a known set of content. When a substantial match is found, the currently displayed A/V content can be identified with a relatively high probability. Methods and apparatus for implementing the audio signature processor 316 are known in the art. For example, in U.S. patent application Ser. No. 09/427,970, incorporated herein by reference in its entirety, Srinivasan, et al. disclose audio signature extraction and correlation techniques. As another example, in Patent Cooperation Treaty Application Serial No. U.S. 03/22562, incorporated herein by reference in its entirety, Lee, et al. disclose signature based program identification apparatus and methods for use with a digital broadcast system. These and/or any other appropriate technique may be used to implement the audio signature processor 316.

The example volume and mute detector 320 is configured to determine whether the input audio samples 304 correspond to an audio signal in a volume mute state. Additionally or alternatively, the volume and mute detector 320 may be configured to determine a volume level associated with the input audio samples 304. Knowledge of whether or not the audio is in a mute state may be used, for example, by a decision processor, such as the decision processor 224 of FIG. 2, to determine which audio engine outputs 308 to process and/or how to process such outputs. Example machine readable instructions 800 that may be executed to implement the volume and mute detector 320 are discussed in the detailed description of FIG. 8 below.

The example compression detector 324 is configured to determine whether the input audio samples 304 correspond to an audio signal that has been subject to compression. Additionally or alternatively, the compression detector 324 is configured to determine which type of compression has been performed on a compressed audio signal. For example, DVDs and digital television systems typically use AC3 compression to store/transmit digital audio, whereas some DVRs/PVRs may use MPEG audio compression. Thus, knowledge of whether the audio has been compressed and, if so, the type of compression employed may be used, for example, by a decision processor, such as the decision processor 224 of FIG. 2, to determine the A/V content source corresponding to the input audio samples 304. Example machine readable instructions 900 that may be executed to implement the compression detector 324 are discussed in the detailed description of FIG. 9 below.

The example jingle detector 328 is configured to determine whether the input audio samples 304 correspond to an audio jingle generated by an A/V content source when, for example, a user causes the A/V content source to display a menu, such as a power-on menu, a channel/program select menu, etc. Knowledge of whether the input audio samples 304 correspond to an audio jingle may be used, for example, by a decision processor, such as the decision processor 224 of FIG. 2, to determine which A/V content source generated the audio jingle and, therefore, is the source of the corresponding input audio samples 304. Known techniques for generating and comparing audio signatures, such as those described above in connection with the example audio signature processor 316, may be adapted to determine whether the input audio samples 304 correspond to a reference audio jingle. Example machine readable instructions 1000 that may be executed to implement the jingle detector 328 are discussed in the detailed description of FIG. 10 below.

The example spectral shape processor 332 is configured to determine whether the input audio samples 304 correspond to an audio signal that possesses a particular spectral shape. For example, audio signals in an analog cable television transmission system may exhibit increased energy in a frequency band at or near 15.75 kHz due to video signal leakage. Thus, knowledge of whether the audio has a particular spectral shape may be used, for example, by a decision processor, such as the decision processor 224 of FIG. 2, to determine the A/V content source corresponding to the input audio samples 304. Example machine readable instructions 1100 that may be executed to implement the spectral shape processor 332 are discussed in the detailed description of FIG. 11 below.

As shown in the example of FIG. 3, the results of each audio engine 312-332 may be scaled/prioritized by a set of respective weights 336-356. For example, the weights 336-356 may explicitly scale the audio engine results based on the amount of information, amount of confidence, etc. that a respective result may contribute to the processing performed by a decision processor, such as the decision processor 224 of FIG. 2. Additionally or alternatively, and in the instant example, the weights 336-356 may be implicit and based, for example, on a stage in which a particular audio engine result is used in a decision process performed by the decision processor, the priority given a particular audio engine result by the decision processor, etc.

Figure 4:
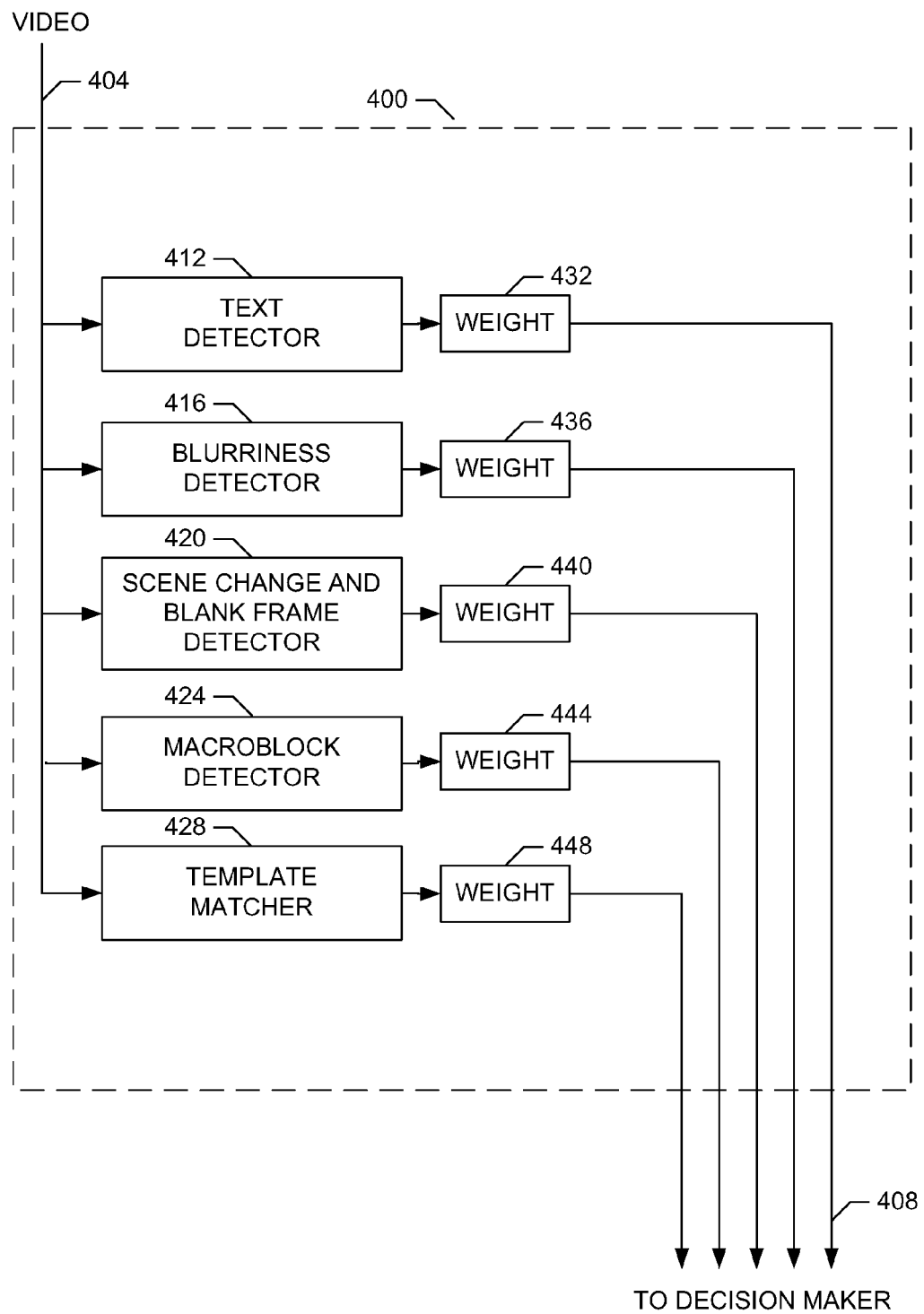
FIG. 4 is a block diagram of an example set of video engines that may be used to implement the example multi-engine meter of FIG. 2.

An example set of video engines 400 that may be used to implement the video engines 232 of FIG. 2 is shown in FIG. 4. The video engines 400 process input video samples 404 provided, for example, by the video buffer 224 of FIG. 2. The input video samples 404 correspond to a video signal being output by an A/V content source (e.g., one of the A/V content sources 102 of FIG. 1) and provided as input to a monitored presentation device, such as the television 116. A video engine included in the video engines 400 is configured to read a number of input video samples 404 at a rate and frequency that depends on the processing performed by that particular video engine. Thus, the video engines 400 may operate autonomously and read the input video samples 404 and generate corresponding video engine outputs 408 in an autonomous fashion.

The example set of video engines 400 includes a text detector 412, a blurriness detector 416, a scene change and blank frame detector 420, a macroblock detector 424 and a template matcher 428. The example text detector 412 is configured to determine whether portions/areas of the video corresponding to the input video samples 404 include text associated, for example, with a known display, such as a menu displayed by a particular A/V content source based on invocation of a selected operating mode. Thus, knowledge of whether the input video samples 404 correspond to video displaying particular text may be used, for example, by a decision processor, such as the decision processor 224 of FIG. 2, to determine the A/V content source corresponding to the input video samples 404. Methods and apparatus for implementing the text detector 412 are known in the art. For example, in Patent Cooperation Treaty Application Serial No. U.S. 04/012272, incorporated herein by reference in its entirety, Nelson, et al. disclose methods and apparatus for detecting a television channel change event that are based on determining whether selected portions of a video display include numeric digits corresponding to a displayed channel number. This and/or any other appropriate technique may be used to implement the text detector 412.

The example blurriness detector 416 is configured to determine whether portions/areas of the video corresponding to the input video samples 404 are blurry or exhibit blurriness characteristics. For example, blurriness may be introduced into video/images as a result of compression associated with a particular A/V content source. Thus, knowledge of whether the input video samples 404 correspond to video exhibiting blurriness may be used, for example, by a decision processor, such as the decision processor 224 of FIG. 2, to determine the A/V content source corresponding to the input video samples 404. Methods and apparatus for implementing the blurriness detector 416 are known in the art. For example, in "Digital Image Restoration," IEEE Signal Processing Magazine, March 1997, pp. 24-41, incorporated herein by reference in its entirety, Banham and Katsaggelos describe various techniques to identify blur in an image. These and/or any other appropriate technique may be used to implement the blurriness detector 416.

The example scene change and blank frame detector 420 is configured to determine whether a set of sequential frames corresponding to the input video samples 404 exhibit, for example, a scene change, a paused frame, one or more blank frames, etc. Such information may be used to determine, for example, whether a trick mode (e.g., pause) has been performed by the A/V content source providing the input video samples 404. Additionally, the number of blank frames detected over a predetermined interval (e.g., such as two minutes) may be used to determine whether the A/V content corresponds, for example, to a commercial pod and, thus, indicate whether the A/V content source is a broadcast source. Thus, knowledge of whether the input video samples 404 correspond to a scene change, a paused frame, a blank frame, etc. may be used, for example, by a decision processor, such as the decision processor 224 of FIG. 2, to determine the A/V content source corresponding to the input video samples 404.

Example machine readable instructions 1200 that may be executed to implement the scene change and blank frame detector 420 are discussed in the detailed description of FIG. 12 below.

The example macroblock detector 424 is configured to determine whether the video corresponding to the input video samples 404 exhibits macroblock characteristics corresponding to MPEG video compression. Additionally, the macroblock detector 424 may determine whether the video signal exhibits nearly perfect color blending indicative of a video game being played via a game console, such as the game console 104 of FIG. 4. Knowledge of whether the input video samples 404 exhibit macroblock characteristics or nearly perfect color blending may be used, for example, by a decision processor, such as the decision processor 224 of FIG. 2, to determine the A/V content source corresponding to the input video samples 404. Example machine readable instructions 1300 that may be executed to implement the macroblock detector 424 are discussed in the detailed description of FIG. 13 below.

The example template matcher 428 is configured to determine whether the video corresponding to the input video samples 404 matches a known/stored template corresponding, for example, to a menu screen being output by a particular A/V content source. Knowledge of whether the input video samples 404 correspond to a known/stored template may be used, for example, by a decision processor, such as the decision processor 224 of FIG. 2, to determine the A/V content source corresponding to the input video samples 404. Known techniques for generating and comparing video signatures, such as those described in, for example, U.S. Pat. No. 6,633,651, entitled "Method and Apparatus for Recognizing Video Sequences" and U.S. Pat. No. 6,577,346, entitled "Recognizing a Pattern in a Video Segment to Identify the Video Segment", both of which are incorporated herein by reference in their entireties, may be adapted to determine whether the input video samples 404 correspond to a reference template. Example machine readable instructions 1400 that may be executed to implement the template matcher 428 are discussed in the detailed description of FIG. 14 below.

As shown in the example of FIG. 4, the results of each video engine 412-428 may be scaled/prioritized by a set of respective weights 432-448. For example, the weights 432-448 may explicitly scale the video engine results based on the amount of information, amount of confidence, etc. that a respective result may contribute to the processing performed by a decision processor, such as the decision processor 224 of FIG. 2. Additionally or alternatively, and in the instant example, the weights 442-448 may be implicit and based, for example, on a stage in which a particular video engine result is used in a decision process performed by the decision processor, the priority given a particular video engine output by the decision processor, etc.

Figure 5:
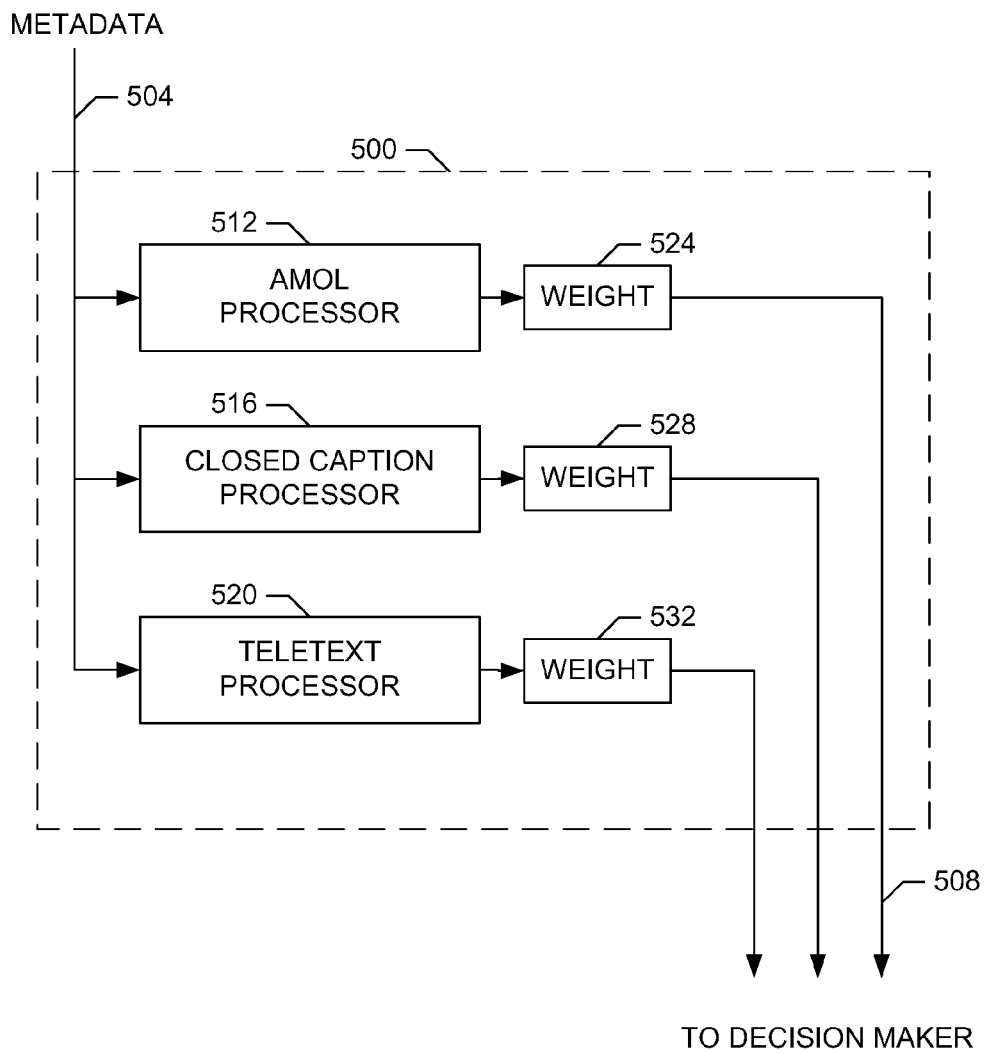
FIG. 5 is a block diagram of an example set of metadata engines that may be used to implement the example multi-engine meter of FIG. 2.

An example set of metadata engines 500 that may be used to implement the metadata engines 240 of FIG. 2 is shown in FIG. 5. The metadata engines 500 process input metadata 504 provided, for example, by the metadata extractor 236 of FIG. 2. The input metadata 504 corresponds to an audio and/or video signal being output by an A/V content source (e.g., one of the A/V content sources 102 of FIG. 1) and provided as input to a monitored presentation device, such as the television 116. A metadata engine included in the metadata engines 500 is configured to read input metadata 504 at a rate and frequency that depends on the processing performed by that particular metadata engine. Thus, the metadata engines 500 may operate autonomously and read the input metadata 504 and generate corresponding metadata engine outputs 508 in an autonomous fashion.

The example set of metadata engines 500 includes an Automated Measurement of Lineup (AMOL) processor 512, a closed caption processor 516 and a teletext processor 520.

The example AMOL processor 512 is configured to determine whether the input metadata 504 corresponds to AMOL codes and to process such codes if present. AMOL codes may be embedded, for example, in broadcast television transmissions to permit identification of transmitted content, the source of the transmitted content, etc. More specifically, AMOL codes may be included in non-viewable portions of a broadcast television signal (e.g., line 20 of the vertical blanking interval (VBI)) and/or in viewable portions of the broadcast television signal (e.g., line 22 of the active video portion of the video signal). Additionally, AMOL codes may be encrypted. Typically, AMOL codes transmitted, for example, in line 20 of the VBI are not recoverable after digital compression because digital video signals do not use the VBI and, therefore, the compression algorithm may discard/corrupt such information. AMOL codes transmitted, for example, in line 22 may be recoverable after digital compression because such codes are transmitted in the active video portion of the video signal.

Thus, processed AMOL codes may be used, for example, by a decision processor, such as the decision processor 224 of FIG. 2, to determine the A/V content source corresponding to the input metadata 504 and additional content identification information. Methods and apparatus for implementing the AMOL processor 512 are known in the art. For example, in U.S. Pat. Nos. 5,425,100 and 5,526,427, incorporated herein by reference in their entirety, Thomas, et al. disclose universal broadcast code and multi-level encoded signal monitoring systems that may be used to process AMOL codes. These and/or any other appropriate technique may be used to implement the AMOL processor 512.

The example closed caption processor 516 is configured to determine whether the input metadata 504 corresponds to closed caption information and to process such information, if present. Closed caption information (such as text) may be included in non-viewable portions of a broadcast television signal (e.g., line 21 of the VBI). Processed closed caption information may be used, for example, by a decision processor, such as the decision processor 224 of FIG. 2, to determine the A/V content source corresponding to the input metadata 504 and additional content identification information. Methods and apparatus for implementing the closed caption processor 516 are known in the art. For example, in U.S. Pat. No. 4,857,999, incorporated herein by reference in its entirety, Welsh describes a video monitoring system that processes closed caption information. This and/or any other appropriate techniques may be used to implement the closed caption processor 516.

The example teletext processor 520 is configured to determine whether the input metadata 504 corresponds to teletext information and to process such information, if present. As with closed caption information, teletext information may be included in non-viewable portions of a broadcast television signal. Processed teletext information may be used, for example, by a decision processor, such as the decision processor 224 of FIG. 2, to determine the A/V content source corresponding to the input metadata 504 and additional content identification information. Methods and apparatus for implementing the teletext processor 520 are known in the art. For example, techniques used to process closed caption information may be adapted to process teletext. As such, any appropriate technique may be used to implement the teletext processor 520.

As shown in the example of FIG. 5, the results of each metadata engine 512-520 may be scaled/prioritized by a set of respective weights 524-532. For example, the weights 524-532 may explicitly scale the metadata engine results based on the amount of information, amount of confidence, etc. that a respective result may contribute to the processing performed by a decision processor, such as the decision processor 224 of FIG. 2. Additionally or alternatively, and in the instant example, the weights 524-532 may be implicit and based, for example, on a stage in which a particular metadata engine result is used in a decision process performed by the decision processor, the priority given a particular metadata engine output by the decision processor, etc.

Persons of ordinary skill in the art will appreciate that additional or alternative metadata processors may be included in the set of metadata engines 500 depending on the type of metadata provided by the metadata input 504. Such an additional or alternative metadata processor may be configured, for example, to process content identification information included in a digital bitstream providing the monitored A/V content. The content identification information could be, for example, a Versatile International Standard Audiovisual Number (VISAN) or any other type of identifier which may be used to identify the monitored A/V content.

A block diagram of an example decision processor 600 that may be used to implement the decision processor 244 of FIG. 2 is illustrated in FIG. 6. The example decision processor 600 receives one or more audio engine results 604 from one or more audio engines (e.g., the audio engines 300 of FIG. 3), one or more video engine results 608 from one or more video engines (e.g., the video engines 400 of FIG. 4) and one or more metadata engine results 612 from one or more metadata engines (e.g., the metadata engines 500 of FIG. 5). The audio engine results 604 are stored in respective audio metric registers 616-620. The video engine results 608 are stored in respective video metric registers 624-628. The metadata engine results 612 are stored in respective metadata metric registers 632-636. The audio metric registers 616-620, the video metric registers 624-628 and the metadata metric registers 632-636 may be implemented as hardware registers, memory locations, etc. or any combination thereof. Because the various audio engine results 604, video engine results 608 and metadata engine results 612 are generated autonomously, the audio metric registers 616-620, the video metric registers 624-628 and the metadata metric registers 632-636 may be updated autonomously when their respective results become available.

The example decision processor 600 includes an audio metric sampler 640, a video metric sampler 644 and a metadata metric sampler 648 to sample (e.g., read the respective results from the hardware register, memory location, etc.), respectively, the audio metric registers 616-620, the video metric registers 624-628 and the metadata metric registers 632-636. The sampling operation may be performed at predetermined intervals, based on an occurrence of a predetermined event, etc., or any combination thereof. The audio metric sampler 640, the video metric sampler 644 and the metadata metric sampler 648 provide the sampled results to a metering engine metric evaluator 652. The metering engine metric evaluator 652 uses the available audio engine results, video engine results and metadata engine results to determine the A/V content source corresponding to the monitored A/V content. The metering engine metric evaluator 652 outputs the detected A/V content source via the source ID output 656.

The metering engine metric evaluator 652 may also determine additional content identification information corresponding to the monitored A/V content. Such content identification information may be output via the content info output 660. Example machine readable instructions 700 that may be executed to implement the metering engine metric evaluator 652 are discussed in the detailed description of FIGS. 7A-7D below.

FIGS. 16A-16F illustrate example decision metrics which may be used by the example metering engine metric evaluator 652 to determine, for example, the A/V content source corresponding to the monitored A/V content and/or whether the A/V content source corresponding to the monitored A/V content has been placed into a special operating mode. FIG. 16A lists decision metrics that may be used to determine whether the A/V content source is a live analog television source (Analog TV Live) or an analog video-on-demand (VOD) source (Analog VOD). A first decision metric indicative of a live analog television source detection is the presence of AMOL codes in line 20 of the VBI of the broadcast television signal (e.g., provided by the AMOL processor 512 of FIG. 5) coupled with the absence of a detected timeshift of the A/V content presentation. As discussed above, the presence of AMOL codes in line 20 of the VBI indicates that the A/V content source is an analog television source because AMOL codes do not survive the compression associated with a digital television source. However, if AMOL codes in line 20 of the VBI are not detected (e.g., by the AMOL processor 512), a live analog television source may also be detected by a second decision metric which includes detecting the presence of an audio signal corresponding to the monitored A/V content presentation (e.g., corresponding to detecting a "no audio mute" condition as determined, for example, by the volume and mute detector 320 of FIG. 3), the presence of cable spectral shaping of the detected audio signal (e.g., detected by the spectral shape processor 332) and the absence of a timeshift. As discussed above, the presence of cable spectral shaping indicates that the detected audio signal was subjected to an analog cable transmission system and, thus, the A/V content source is an analog television source.

Similarly, FIG. 16A lists two decision metrics that may be used to detect an analog VOD source. The first analog VOD decision metric employs the presence of AMOL codes in line 20 of the VBI (e.g., provided by the AMOL processor 512) to detect an analog television source, coupled with the presence of a timeshift to indicate that the source is not live but rather an analog VOD source. If AMOL codes in line 20 of the VBI are not present (e.g., as determined by the AMOL processor 512), the second analog VOD decision metric may be evaluated and includes detecting the presence of the audio signal corresponding to the A/V content presentation (e.g., corresponding to detecting a "no audio mute" condition as determined, for example, by the volume and mute detector 320 of FIG. 3), detecting the presence of cable spectral shaping indicative of an analog television source (e.g., detected by the spectral shape processor 332) and detecting a timeshift indicative of a VOD presentation. A timeshift of the A/V content presentation may be detected using various techniques, such as, for example, comparing a broadcast timestamp included in the AMOL information with a real-time clock included in the multi-engine meter 200, comparing a timestamp included in audio codes embedded in the detected audio signal with the real time clock included in multi-engine meter 200, etc.

FIG. 16B lists two decision metrics corresponding to a third possible analog source, namely, a video cassette recorder (VCR) playback. The first VCR playback decision metric combines the presence of AMOL codes in line 20 of the VBI (e.g., provided by the AMOL processor 512) indicative of an analog television source, the presence of a timeshift indicative of an analog television source that is not live and the absence of spectral shaping indicative of a cable television transmission system (e.g., as determined by the spectral shape processor 332) to indicate that the source is a local VCR and not a cable television transmission system. If AMOL codes in line 20 of the VBI are not detected (e.g., by the AMOL processor 512), then the second VCR playback decision metric may be evaluated to detect a VCR playback and includes detecting the presence of the audio signal corresponding to the A/V content presentation (e.g., corresponding to detecting a "no audio mute" condition as determined, for example, by the volume and mute detector 320 of FIG. 3), detecting the absence of spectral shaping indicative of a cable television transmission system (e.g., as determined by the spectral shape processor 332) and detecting the absence of any characteristics associated with a digital television transmission, such as video macroblocking (e.g., as determined by the macroblock detector 424 of FIG. 4), AC3 audio compression (e.g., as determined by the compression detector 324) or MPEG audio compression (e.g., as determined by the compression detector 324), as discussed above. By a process of elimination, the second VCR playback decision metric determines that the A/V content source corresponds to a local analog source and, thus, a VCR playback.

FIG. 16B also lists a decision metric that may be used to detect a digital A/V content source corresponding to a digital versatile disk (DVD) playback. The DVD playback decision metric combines the absence of AMOL codes in line 20 of the VBI (e.g., as determined by the AMOL processor 512) indicative of an analog television source with detecting the presence of the audio signal corresponding to the A/V content presentation (e.g., corresponding to detecting a "no audio mute" condition as determined, for example, by the volume and mute detector 320 of FIG. 3), detecting video macroblocking (e.g., by the macroblock detector 424) indicative of a digital video presentation and detecting AC3 audio compression (e.g., by the compression detector 324) indicative of a digital audio presentation. AC3 audio compression is used to store audio content on a DVD and video macroblocking is more readily evident in a DVD video presentation than in a digital television presentation (as discussed in more detail below). Thus, the presence of AC3 audio compression and video macroblocking may be used to determine whether the A/V content source corresponds to a DVD playback.

FIG. 16C lists decision metrics that may be used to detect digital television sources corresponding to a live broadcast (Digital TV Live) or a playback through a digital video recorder or similar device (Digital TV DVR Playback). These metrics combine the absence of AMOL codes in line 20 of the VBI (e.g., as determined by the AMOL processor 512) indicative of an analog television source with detecting the presence of the audio signal corresponding to the A/V content presentation (e.g., corresponding to detecting a "no audio mute" condition as determined, for example, by the volume and mute detector 320 of FIG. 3), determining the absence of significant video macroblocking (e.g., as determined by the macroblock detector 424) and detecting AC3 audio compression (e.g., by the compression detector 324) indicative of a digital audio presentation. Live digital television is distinguishable from a DVR playblack by, respectively, the absence or presence of a detected timeshift. As in the case of a DVD playback, digital television employs AC3 audio compression. However, in the case of digital television, as compared to a DVD playback, significant video macroblocking is usually not evident due to anti-macroblocking filters present in the digital television transmission system, less compression in the digital television video signal compared to the DVD video signal, transmission noise in the digital television signal not present in a DVD playback, etc. Thus, the presence of AC3 audio compression and absence of significant video macroblocking may be used to distinguish a digital television source from a DVD playback.

FIG. 16D lists decision metrics that may be used to detect DVR sources employing MPEG audio compression and providing either a live broadcast (MPEG DVR Live) or a delayed playback of previously recorded A/V content (MPEG DVR Playback). These metrics combine the absence of AMOL codes in line 20 of the VBI (e.g., as determined by the AMOL processor 512) indicative of an analog television source with detecting the presence of the audio signal corresponding to the A/V content presentation (e.g., corresponding to detecting a "no audio mute" condition as determined, for example, by the volume and mute detector 320 of FIG. 3), determining the absence of significant video macroblocking (e.g., as determined by the macroblock detector 424) and detecting MPEG audio compression (e.g., by the compression detector 324) indicative of an MPEG DVR audio presentation. A live MPEG DVR presentation is distinguishable from an MPEG DVR playblack by, respectively, the absence or presence of a detected timeshift. The input to an MPEG DVR is typically a digital TV broadcast and, therefore, the resulting MPEG DVR video signal will usually exhibit no significant macroblocking because the digital television video signal exhibits no significant macroblocking due to the reasons discussed above. Thus, the presence of MPEG audio compression and absence of significant video macroblocking may be used to detect an MPEG DVR source.

FIG. 16E lists a decision metric that may be used to detect a video game source. The video game decision metric combines the absence of AMOL codes in line 20 of the VBI (e.g., as determined by the AMOL processor 512) indicative of an analog television source with detecting the presence of the audio signal corresponding to the A/V content presentation (e.g., corresponding to detecting a "no audio mute" condition as determined, for example, by the volume and mute detector 320 of FIG. 3) and a video macroblocking result of zero (e.g., determined by the macroblock detector 424) representative of perfect color blending. Perfect color blending is indicative of a video game presentation, as discussed above, and, thus, may be used to detect a video game source.

FIG. 16E also lists decision metrics that may be used to detect A/V content source special operating modes corresponding to a blank frame state or an audio mute state. The blank frame metric is based on detecting the presence of a blank video frame (e.g., by the scene change and blank frame detector 420 of FIG. 4). The audio mute metric is based on detecting the absence of an audio signal corresponding to an A/V content presentation (e.g., as determined by the volume and mute detector 320). The audio mute metric may also examine whether closed caption or teletext data is present (e.g., as determined by the closed caption processor 516 and telextext processor 520 of FIG. 5, respectively) to verify that A/V content presentation corresponds only to an audio mute state and not another special operating mode as discussed below.

FIG. 16F lists decision metrics that may be used to detect additional special operating modes corresponding to a menu display and a pause state. The menu display metric is based on detecting a paused video display (e.g., by the scene change and blank frame detector 420) and matching the A/V content presentation to a template, jingle and/or text corresponding to the menu display (e.g., as determined by the template matcher 428 of FIG. 4, the jingle detector 328 of FIG. 3 and the text detector 412 of FIG. 4, respectively). Optionally, the menu display metric may also examine whether the audio signal corresponding to the A/V content presentation is absent (e.g., as determined by the volume and mute detector 320) and/or closed caption or teletext data is absent (e.g., as determined by the closed caption processor 516 and telextext processor 520, respectively) to further validate that the current display does not correspond to a normal A/V content presentation. The pause metric is based on detecting the absence of the audio signal corresponding to the A/V content presentation (e.g., as determined by the volume and mute detector 320), the absence of closed caption or teletext data (e.g., as determined by the closed caption processor 516 and telextext processor 520, respectively), a paused video display (e.g., by the scene change and blank frame detector 420) and the absence of a template and/or text match (e.g., as determined by the template matcher 428 and the text detector 412, respectively) corresponding to a menu display.

Finally, FIG. 16 F also lists a metric that may be used to determine whether the A/V content source is operating in some other trick mode, such as, for example, a rewind state, a fast-forward state, etc. The trick mode metric is based on detecting the absence of the audio signal corresponding to the A/V content presentation (e.g., as determined by the volume and mute detector 320), the absence of closed caption or teletext data (e.g., as determined by the closed caption processor 516 and telextext processor 520, respectively), and also detecting the absence of a paused video display or a blank frame (e.g., as determined by the scene change and blank frame detector 420). The absence of the audio signal and the closed caption or teletext data indicates that the active display does not correspond to a normal A/V content presentation. However, because the video display does not correspond to a pause state (indicative of a paused frame or a menu display) or a blank frame, the active display is deemed to correspond to some other trick mode operation of the A/V content source.

Flowcharts representative of example machine readable instructions that may be executed to implement the metering engine metric evaluator 652 of FIG. 6 and at least some of the audio engines 300 of FIG. 3 and the video engines 400 of FIG. 4 are shown in FIGS. 7A-7D through FIG. 14. In these examples, the machine readable instructions represented by each flowchart may comprise one or more programs for execution by: (a) a processor, such as the processor 1512 shown in the example computer 1500 discussed below in connection with FIG. 15, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1512, but persons of ordinary skill in the art will readily appreciate that the entire program or programs and/or portions thereof could alternatively be executed by a device other than the processor 1512 and/or embodied in firmware or dedicated hardware in a well-known manner (e.g., implemented by an application specific integrated circuit (ASIC), a programmable logic device (PLD), a field programmable logic device (FPLD), discrete logic, etc.). For example, any or all of the metering engine metric evaluator 652, the audio engines 300 and/or the video engines 400 (as well as the metadata engines 500 of FIG. 5) could be implemented by any combination of software, hardware, and/or firmware. Also, some or all of the machine readable instructions represented by the flowchart of FIGS. 7A-7D through FIG. 14 may be implemented manually. Further, although the example machine readable instructions are described with reference to the flowcharts illustrated in FIGS. 7A-7D through FIG. 14, persons of ordinary skill in the art will readily appreciate that many other techniques for implementing the example methods and apparatus described herein may alternatively be used. For example, with reference to the flowcharts illustrated in FIGS. 7A-7D through FIG. 14, the order of execution of the blocks may be changed, and/or some of the blocks described may be changed, eliminated, combined and/or subdivided into multiple blocks.

Example machine readable instructions 700 that may be executed to implement the metering engine metric evaluator 652 of FIG. 6 are shown in FIGS. 7A-7D. While the example machine readable instructions 700 are based on the decision metrics shown in FIGS. 16A-16F and targeted for a monitored television conforming to the NTSC standard, the machine readable instructions may be readily modified to support any type of display/information presentation device. The example machine readable instructions 700 may be executed at predetermined intervals, based on an occurrence of a predetermined event, etc., or any combination thereof. The machine readable instructions 700 begin execution at block 701 of FIG. 7A at which the metering engine metric evaluator 652 samples the available audio, video and metadata metrics/results obtained, for example, from the audio engines 300, the video engines 400 and the metadata engines 500. Control then proceeds to sub-process 702, discussed in greater detail below in connection with FIG. 7B, at which the metering engine metric evaluator 652 determines the A/V content source providing the monitored A/V content presentation. After sub-process 702 completes, control then proceeds to sub-process 703, discussed in greater detail below in connection with FIG. 7C, at which the metering engine metric evaluator 652 determines content identification information (e.g., tuning data) corresponding to the monitored A/V content presentation provided by the A/V content source identified by sub-process 701. Next, after sub-process 703 completes, control then proceeds to sub-process 704, discussed in greater detail below in connection with FIG. 7D, at which the metering engine metric evaluator 652 detects any special operating modes of the A/V content source identified by sub-process 701. Finally, after sub-process 704 completes, control proceeds to block 705 at which the metering engine metric evaluator 652 reports the identified A/V content source, the content identification information (e.g., tuning data) and/or any special operating modes of the A/V content source via the outputs 656 and 660 to, for example, a central facility for generation of audience measurement statistics. The example process 700 then ends.

Figure 7A:
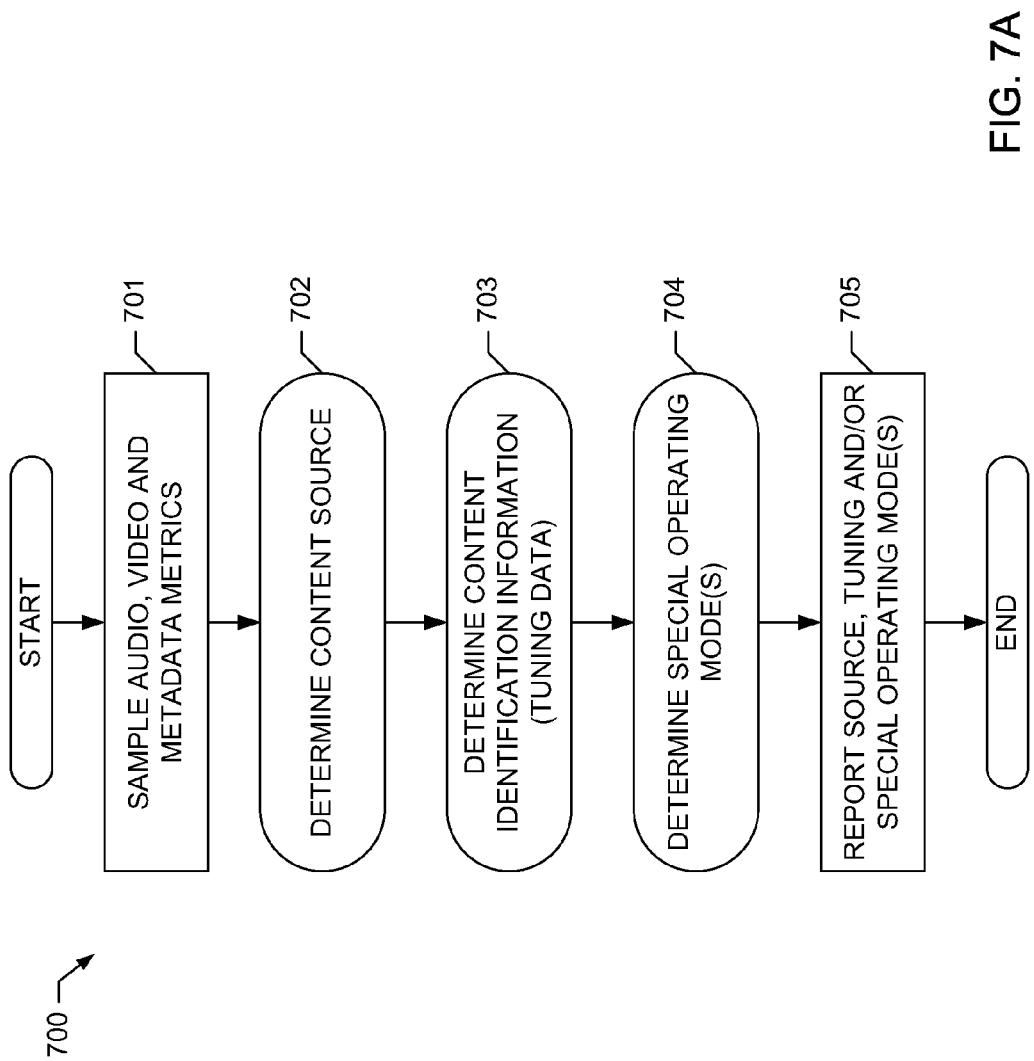
FIGS. 7A-7D collectively form a flowchart representative of example machine readable instructions that may be executed to implement the example decision processor of FIG. 6.
Figure 7B:
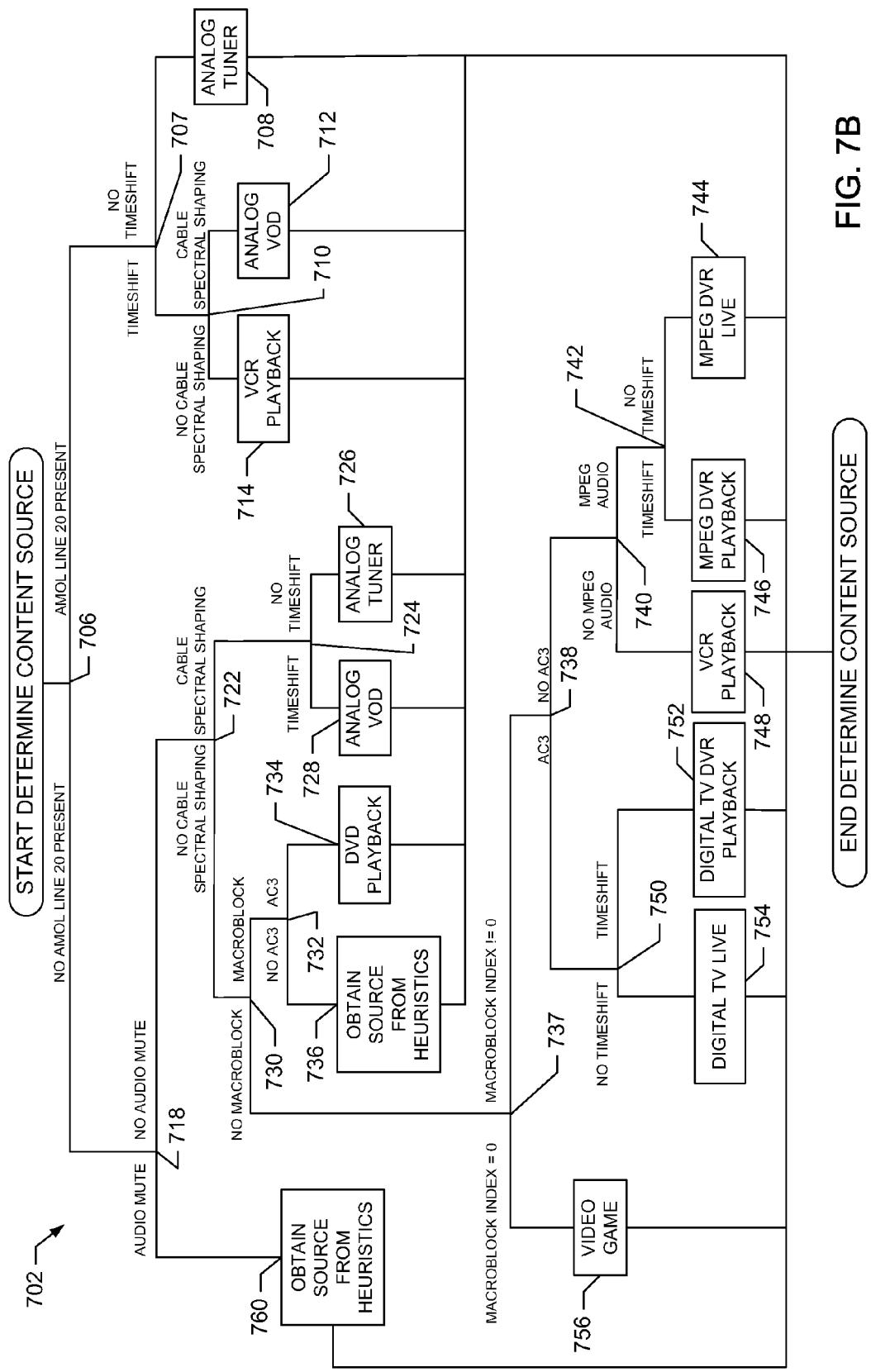

An example sub-process 702 to determine which A/V content source is providing a monitored A/V content presentation is shown in FIG. 7B and is based on the example decision metrics listed in FIGS. 16A-16F. The example process 702 begins at decision node 706 at which the metering engine metric evaluator 652 determines whether the video metrics sampled at block 701 of FIG. 7A indicate that AMOL information is present in line 20 of an NTSC television signal as processed, for example, by the AMOL processor 512. If AMOL information in line 20 is present (decision node 706) then control proceeds to decision node 707 at which the metering engine metric evaluator 652 detects whether the A/V content is being presented with a timeshift, for example, based on comparing a broadcast timestamp included in the AMOL information with the current processing time. The current processing time may be determined, for example, based on a real-time clock function executing in or a real-time clock apparatus coupled with the metering engine metric evaluator 652, the multi-engine meter 200 or a similar device.

If a timeshift is not detected (decision node 707), then control proceeds to block 708 and, based on the presence of AMOL information in line 20 and according to the first analog TV live metric of FIG. 16A, the metering engine metric evaluator 652 determines that the A/V content source is an analog television broadcast (e.g., terrestrial, cable, etc.). The example sub-process 702 then ends.

If, however, a timeshift is detected (decision node 707), then control proceeds to decision node 710 at which the metering engine metric evaluator 652 determines whether the audio metrics indicate that the monitored audio exhibits spectral shaping consistent with a broadcast analog cable television system. Such a metric may be provided, for example, by the spectral shape processor 332. If the metering engine metric evaluator 652 determines that cable spectral shaping is present (decision node 710), then according to the first analog VOD metric of FIG. 16A, control proceeds to block 712 and, based on the presence of AMOL information in line 20, the analog cable spectral shaping and the detected timeshift, the metering engine metric evaluator 652 determines that the A/V content source is an analog video-on-demand (VOD) presentation. The example sub-process 702 then ends. If, however, cable spectral shaping is not detected (decision node 710), then according to the first VCR playback metric of FIG. 16B, control proceeds to block 714 and, based on the presence of AMOL information in line 20, the detected timeshift and lack of cable spectral shaping, the metering engine metric evaluator 652 determines that the A/V content source is a VCR playback. The example sub-process 702 then ends.

Returning to decision node 706, if, however, AMOL information is not present in line 20, then control proceeds to decision node 718 at which the metering engine metric evaluator 652 determines whether the audio metrics indicate that an audio mute state has been detected, for example, by the volume and mute detector 320. If an audio mute state has not been detected (decision node 718) and, thus, an audio signal corresponding to the monitored A/V content is present, control proceeds to decision node 722 at which the metering engine metric evaluator 652 determines whether the audio metrics indicate that the monitored audio exhibits spectral shaping consistent with a broadcast analog cable television system. If cable spectral shaping is present (decision node 722), then control proceeds to decision node 724 at which the metering engine metric evaluator 652 detects whether the A/V content is being presented with a timeshift. The metering engine metric evaluator 652 may determine whether a timeshift is present based on, for example, comparing a broadcast timestamp included in audio codes embedded in the audio signal with the current processing time. If a timeshift is not detected (decision node 724), then according to the second analog TV live metric of FIG. 16A, control proceeds to block 726 and, based on the presence of the audio signal having cable spectral shaping, the metering engine metric evaluator 652 determines that the A/V content source is an analog television broadcast. The example sub-process 702 then ends. If, however, a timeshift is detected (decision node 724), then according to the second analog VOD live metric of FIG. 16A, control proceeds to block 728 and, based on the presence of audio codes, the analog cable spectral shaping and the detected timeshift, the metering engine metric evaluator 652 determines that the A/V content source is an analog VOD transmission. The example sub-process 702 then ends.

Returning to decision node 722, if, however, analog cable spectral shaping is not present, then control proceeds to decision node 730 at which the metering engine metric evaluator 652 determines whether the video metrics indicate that macroblocks have been detected, for example, by the macroblock detector 424. If macroblocks have been detected (decision node 730), then control proceeds to decision node 732 at which the metering engine metric evaluator 652 determines whether the audio metrics indicate that the audio signal has been subjected to AC3 compression, for example, as detected by the compression detector 324. If AC3 compression is detected (decision node 732), then according to the DVD playback metric of FIG. 16B, control proceeds to block 734 and, based on the absence of analog cable spectral shaping and the presence of macroblocks and AC3 compression, the metering engine metric evaluator 652 determines that the A/V content source is a DVD playback. The example sub-process 702 then ends.

If, however, AC3 compression is not detected (decision node 732), then the metering engine metric evaluator 652 determines there is insufficient information to determine the A/V content source directly from the audio, video and metadata metrics sampled at block 701 of FIG. 7A. Thus, control proceeds to block 736 at which the metering engine metric evaluator 652 uses previously stored heuristic information to determine the A/V content source. Using stored heuristics to determine the A/V content source is discussed in greater detail below. After processing at block 736 completes, the example sub-process 702 then ends.

If, however, macroblocks have not been detected (decision node 730), then control proceeds to decision node 737 at which the metering engine metric evaluator 652 determines whether the video metrics indicate that the macroblocking index output by, for example, the macroblock detector 424 is equal to zero, indicative of perfect color matching. If the macroblock index is not equal to zero, control proceeds to decision node 738 at which the metering engine metric evaluator 652 determines whether the audio metrics indicate that AC3 compression has been detected. If AC3 compression has not been detected (decision node 738), then control proceeds to decision node 740 at which the metering engine metric evaluator 652 determines whether the audio metrics indicate that the audio signal has been subjected to MPEG audio compression, for example, as detected by the compression detector 324. If MPEG audio compression has been detected (decision node 740), then control proceeds to decision node 742 at which the metering engine metric evaluator 652 detects whether a timeshift is present, for example, by comparing timestamp information included in the MPEG audio compression data with the current processing time. If a timeshift is not detected (decision node 742), then according to the MPEG DVR live metric of FIG. 16D, control proceeds to block 744 and, based on the presence of MPEG audio compression, the absence of macroblocks and no detected timeshift, the metering engine metric evaluator 652 determines that the A/V content source is an MPEG-type DVR outputting a "live" broadcast program. If, however, a timeshift is detected (decision node 742), then according to the MPEG DVR playback metric of FIG. 16D, control proceeds to block 746 and, based on the absence of macroblocks, the presence of MPEG audio compression and the detected timeshift, the metering engine metric evaluator 652 determines that the A/V content source is an MPEG-type DVR playing back previously recorded A/V content. If, however, MPEG audio compression has not been detected (decision node 740), then according to the second VCR playback metric of FIG. 16B, control proceeds to block 748 and, due to the absence of macroblocks, audio compression and AMOL information, the metering engine metric evaluator 652 determines that the A/V content source is a VCR playing back pre-recorded A/V content. After processing at either block 744, block 746 or block 748 completes, the example sub-process 702 then ends.

Returning to decision node 738, if, however, AC3 compression has been detected, control proceeds to decision node 750 at which the metering engine metric evaluator 652 detects whether a timeshift is present, for example, by comparing timestamp information included in the AC3 audio compression data with the current processing time. If a timeshift is detected (decision node 750), then according to the digital TV playback metric of FIG. 16C, control proceeds to block 752 and, based on the absence of macroblocks and the presence of AC3 audio compression and the detected timeshift, the metering engine metric evaluator 652 determines that the A/V content source is, for example, a cable television DVR outputting previously recorded A/V content (block 752). If, however, a timeshift is not detected (decision node 742), then according to the digital TV live metric of FIG. 16C, control proceeds to block 754 and, based on the presence of AC3 audio compression and the absence of macroblocks and no detected timeshift, the metering engine metric evaluator 652 determines that the A/V content source is a digital cable broadcast (possibly passed through an associated DVR) outputting "live" A/V content. After processing at blocks 752 or 754 completes, the example sub-process 702 then ends.

If, however, at decision node 737 the metering engine metric evaluator 652 determined that the macroblock index output by the macroblock detector 424 was equal to zero, control proceeds to block 756. At block 756, and according to the video game decision metric of FIG. 16E, the metering engine metric evaluator 652 determines that the A/V content source is a video game based on the perfect color matching represented by a macroblock index equal to zero. The example sub-process 702 then ends.

Figure 7C:
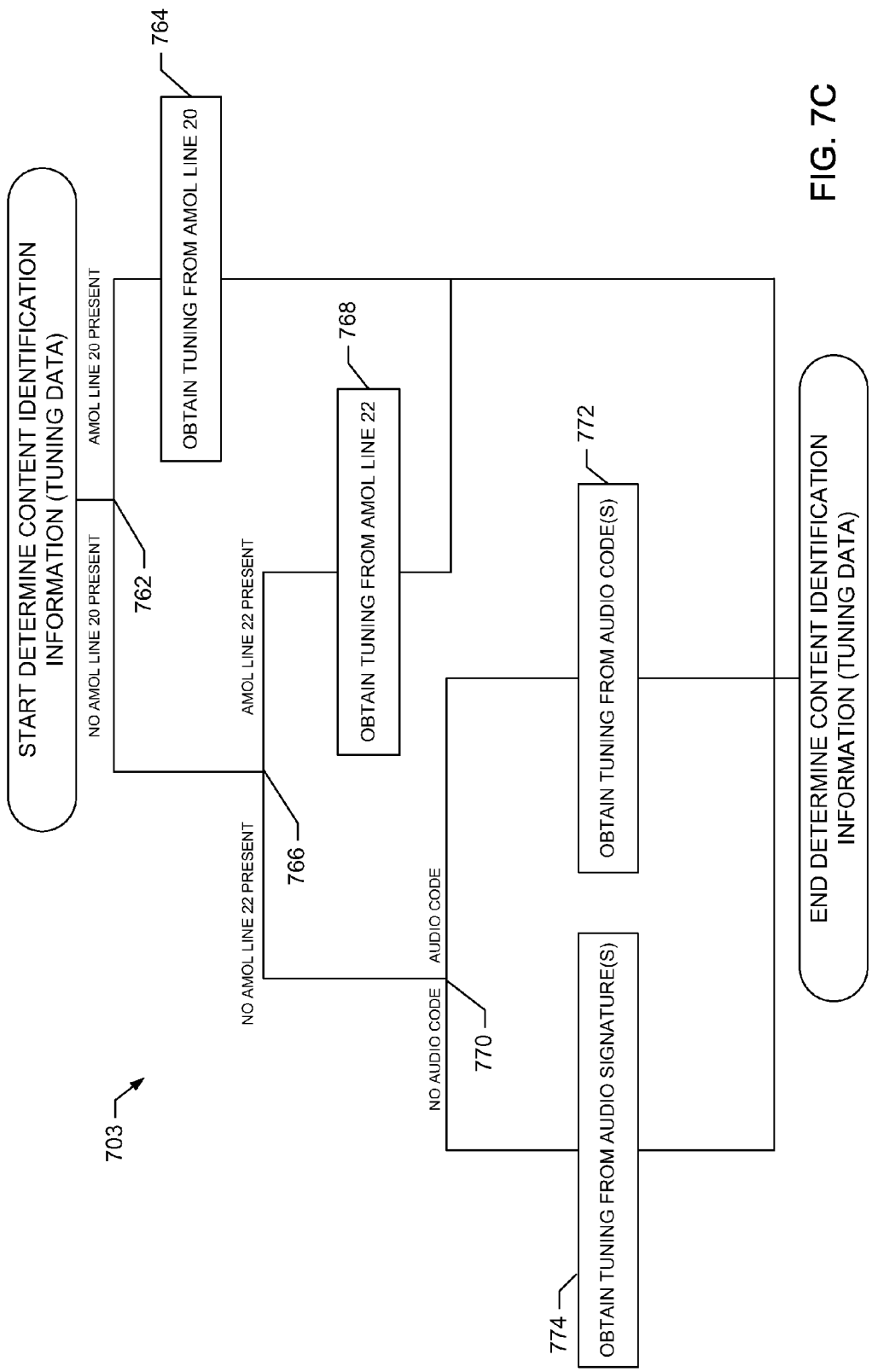

Returning to decision node 718, if the metering engine metric evaluator 652 determines that an audio mute state has been detected, for example, by the volume and mute detector 320, the metering engine metric evaluator 652 may determine that there is insufficient information to determine the A/V content source due to the lack of audio or AMOL information provided by the audio, video and metadata metrics sampled at block 701 of FIG. 7A. Thus, control proceeds to block 760 at which the metering engine metric evaluator 652 uses previously stored heuristic information to determine the A/V content source. Using stored heuristics to determine the A/V content source is discussed in greater detail below. After processing at block 760 completes, the example sub-process 702 then ends An example sub-process 703 to determine content identification information (e.g., tuning data) corresponding to the content presentation provided by the A/V content source identified, for example, by sub-process 701 of FIG. 7B is shown in FIG. 7C. The content identification information may include, for example, a content/program name, a broadcast time, a broadcast station ID/channel number, etc. The example sub-process 703 begins at decision node 762 at which, for example, the metering engine metric evaluator 652 of FIG. 6 determines whether the video metrics sampled at block 701 of FIG. 7A indicate that AMOL information is present in line 20 of an NTSC television signal as processed, for example, by the AMOL processor 512. If AMOL information in line 20 is present (decision node 762) control then proceeds to block 764 at which the metering engine metric evaluator 652 determines content identification information from detected AMOL information in line 20 based on any appropriate technique, such as those described above in connection with the AMOL processor 512. The example sub-process 703 then ends.

If, however, AMOL information is not present in line 20 (decision node 762), control proceeds to decision node 766 at which the metering engine metric evaluator 652 determines whether the video metrics indicate that AMOL information is present in line 22. If AMOL information in line 22 is present (decision node 766) then control proceeds to block 768 at which the metering engine metric evaluator 652 determines content identification information from detected AMOL information in line 22 based on any appropriate technique, such as those described above in connection with the AMOL processor 512. The example sub-process 703 then ends.

If, however, AMOL information is not present in line 22 (decision node 766), control proceeds to decision node 770 at which the metering engine metric evaluator 652 determines whether the audio metrics indicate that audio codes are present, for example, as processed by the audio code detector 312 of FIG. 3. If audio codes are present (decision node 770), then control proceeds to block 772 at which the metering engine metric evaluator 652 determines program identification information from the available audio codes based on any appropriate technique, such as those described above in connection with the audio code detector 312. The example sub-process 703 then ends.

If, however, audio codes are not present (decision node 770), control proceeds to block 774 at which the metering engine metric evaluator 652 may determine program identification information by comparing, for example, an audio signature corresponding to the monitored A/V content presentation, and generated by the audio signature processor 316 of FIG. 3, to a set of known reference signatures. Additionally or alternatively, the metering engine metric evaluator 652 may output the audio signature corresponding to the monitored A/V content for comparison to a set of known reference signatures at, for example, a central processing facility. Any known technique for generating and comparing signatures may be employed at block 774 to ascertain the desired content identification information, such as those described above in connection with the audio signature processor 316. In any case, after processing at block 774 completes, the example sub-process 703 then ends.

Figure 7D:
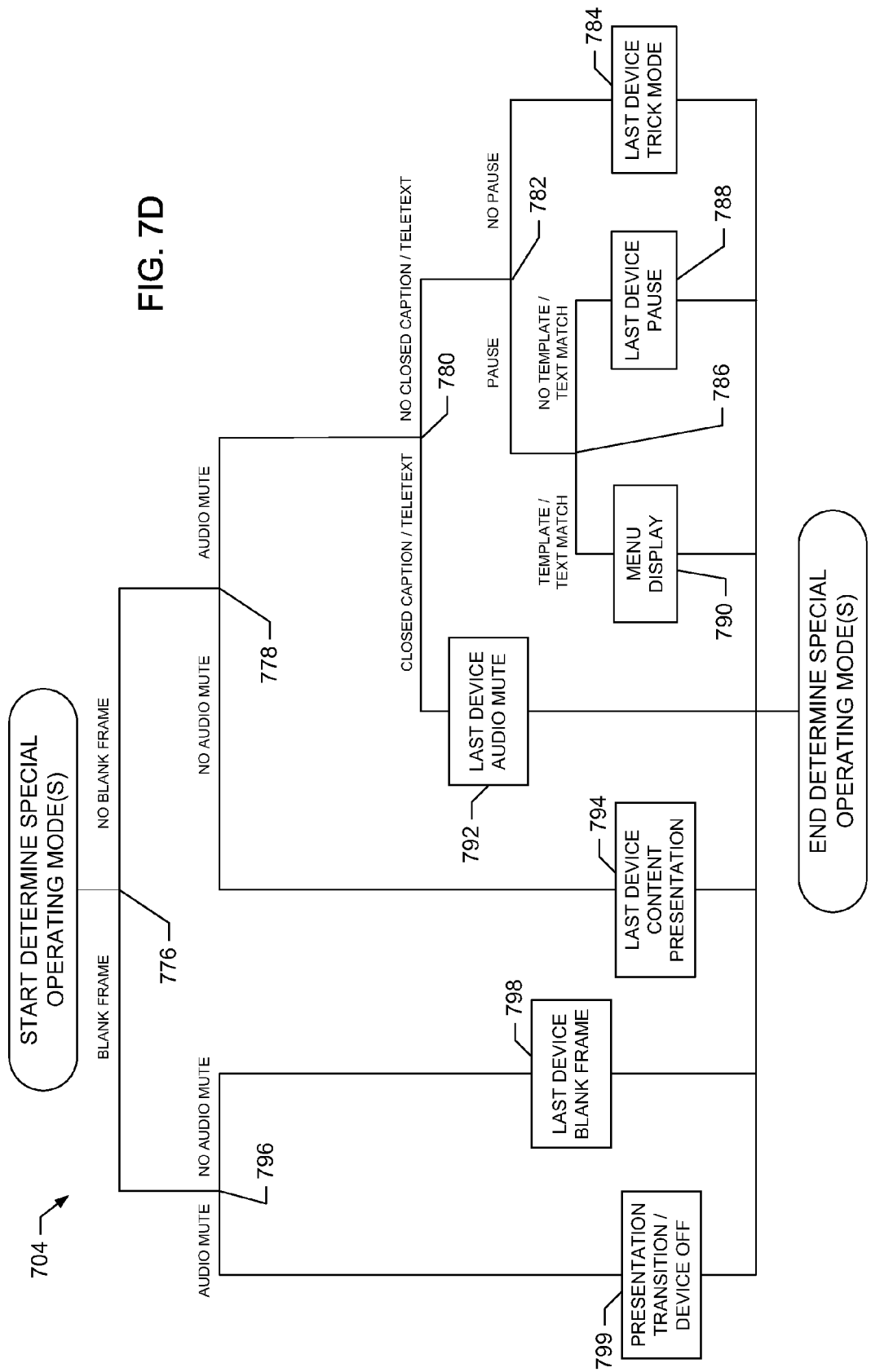

An example sub-process 704 to detect any special operating modes of the A/V content source identified, for example, by sub-process 701 of FIG. 7B is shown in FIG. 7D and is based on the decision metrics listed in FIGS. 16A-16F. The special operating modes detected by sub-process 704 include a blank frame mode, an audio mute mode, a pause mode, a menu display mode, a device OFF mode, and a catch-all trick mode indication. The catch-all trick mode indication is used to indicate that the identified A/V content source may be engaged in any number of special trick modes of operation including, for example, a rewind mode, a fast-forward mode, etc. The example sub-process 704 begins at decision node 776 at which the metering engine metric evaluator 652 determines whether the video metrics sampled at block 701 of FIG. 7A indicate that the monitored A/V content presentation corresponds to a blank frame as detected, for example, by the scene change and blank frame detector 420 of FIG. 4. If a blank frame is not detected (decision node 776), control proceeds to decision node 778 at which the metering engine metric evaluator 652 determines whether an audio mute state has been detected, for example, by the volume and mute detector 320.

If an audio mute state is detected (decision node 778), then control proceeds to decision node 780 at which the metering engine metric evaluator 652 determines whether the metadata metrics indicate that closed caption or teletext information is present as processed, for example, by the closed caption processor 516 or teletext processor 520, respectively, of FIG. 5. If closed caption or teletext information is not present (decision node 780), control then proceeds to decision node 782 at which the metering engine metric evaluator 652 determines whether the video metrics indicate that a pause state has been detected, for example, by the scene change and blank frame detector 420. If the pause state is not detected (decision node 782), then according to the trick mode metric of FIG. 16F, control proceeds to block 784 and, based on the absence of audio, closed caption information and the pause state, the metering engine metric evaluator 652 determines that the most recently identified A/V content source is operating in a trick mode (because the absence of any audio and a pause in the video indicates an abrupt transition in the presentation of the A/V content). The example sub-process 704 then ends If, however, a pause state is detected (decision node 782), control the proceeds to decision node 786 at which the metering engine metric evaluator 652 determines whether the video metrics indicate that the paused video frame matches a known template, for example, as determined by the template matcher 428, or contains predetermined text, for example, as determined by the text detector 412 of FIG. 4. If a template or text match is not detected (decision node 786), then according to the pause metric of FIG. 16F, control proceeds to block 788 and, based on the presence of the pause state and absence of the template or text match, the metering engine metric evaluator 652 determines that the most recently identified A/V content source has entered a pause mode of operation. If, however, a template or text match is detected (decision node 786), then according to the menu display decision metric of FIG. 16F, control proceeds to block 790 and the metering engine metric evaluator 652 determines that the corresponding A/V content source is displaying a menu corresponding to the matched reference template or predetermined text. After processing at block 788 or 790 completes, the example sub-process 704 then ends.

Returning to decision node 780, if, however, closed caption or teletext information is present, then according to audio mute decision metric of FIG. 16E, control proceeds to block 792 and, based on the presence of closed caption information and the audio mute state, the metering engine metric evaluator 652 determines that the most recently identified A/V content source has entered an audio mute mode of operation. The example sub-process 704 then ends. If, however, at decision node 778 the metering engine metric evaluator 652 determines that the audio is not muted and, thus, an audio signal corresponding to the monitored A/V content presentation is present, then due to the absence of a blank frame determined at decision node 776, control may proceed to block 794 at which the metering engine metric evaluator 652 may determine that the most recently identified A/V content source is operating in a normal presentation mode. The example sub-process 704 then ends.

Returning to decision node 776, if a blank frame is detected, for example, by the scene change and blank frame detector 420, control proceeds to decision node 796 at which the metering engine metric evaluator 652 determines whether an audio mute state has been detected, for example, by the volume and mute detector 320. If an audio mute state is not detected (decision node 796), then according to the blank frame decision metric of FIG. 16E, control proceeds to block 798 and the metering engine metric evaluator 652 determines that the most recently identified A/V content source is displaying a blank frame. However, if an audio mute state is detected (decision node 796), then based on the lack of a detected audio signal coupled with a blank video frame, control may proceed to block 799 at which the metering engine metric evaluator 652 may determine that a presentation transition has occurred (e.g., corresponding to a transition between a program and a commercial). If the audio mute and blank frame states are of significant duration, then at block 799 the metering engine metric evaluator 652 may determine that the most recently identified A/V content source has been placed in an OFF state. In any case, after processing at blocks 798 or 799 completes, the example sub-process 704 then ends.

Additionally, although not shown in FIGS. 7A-7D, a multi-engine meter employing the example process 700 or any similar process may use other detected information to ascertain the A/V content source and/or associated content identification information. For example, the multi-engine meter 200 of FIG. 2 includes a remote control detector 252 to detect and process signals received from a remote control device. The received remote control signals may be decoded and processed to determine, for example, which of a set of possible A/V content sources is being controlled by a user, the operating state of such A/V content source, etc.

In certain circumstances, for example, when sufficient metric information is not available, the example machine readable instructions 700 may use stored heuristics to determine the A/V content source, content identification information, etc. For example, a multi-engine meter executing the machine readable instructions 700, or a similar process, may store statistical information regarding previous A/V content source selection, content identification, etc. The information may be categorized, for example, by time of day, sequence of selection, etc. Then, as shown in FIG. 7B, in certain circumstances the machine readable instructions 700 may employ a set of heuristic rules to determine the A/V content source based on the stored statistical information.

Also, as discussed above, the audio metrics, video metrics and metadata metrics may be updated autonomously and, thus, a particular metric or set of metrics may not be available when the machine readable instructions 700 read the metrics at block 701. Thus, the machine readable instructions 700 may employ one or more timeout timers to cause one or more audio, video or metadata metrics to be reset to a known state. This mechanism prevents metric information from becoming stale if not updated within an expected/reasonable amount of time.

Figure 8:
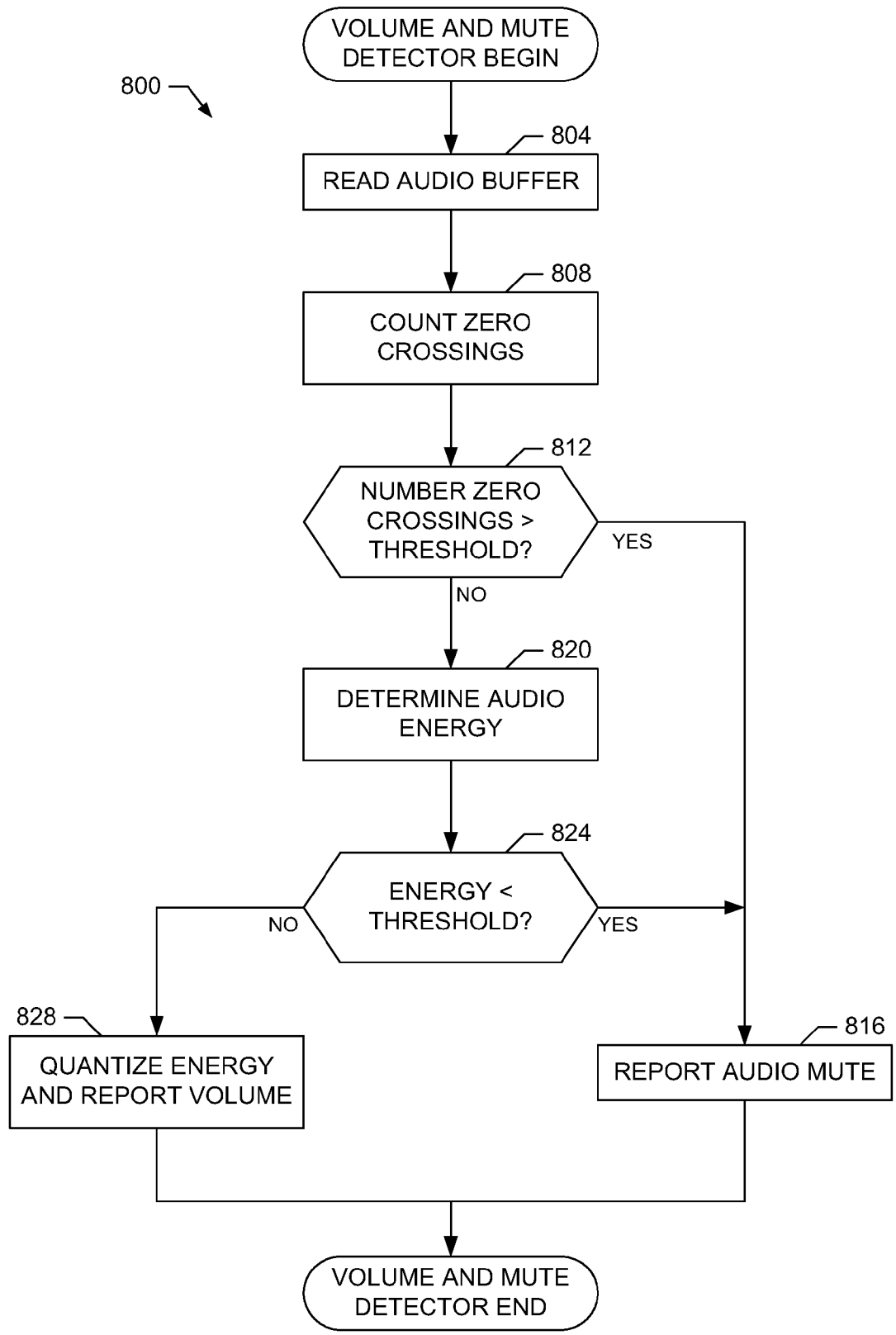
FIG. 8 is a flowchart representative of example machine readable instructions that may be executed to implement the example volume and mute detector of FIG. 3.

Example machine readable instructions 800 that may be executed to implement the volume and mute detector 320 of FIG. 3 are shown in FIG. 8. The machine readable instructions 800 begin execution at block 804 at which the volume and mute detector 320 reads samples from an audio buffer such as, for example, the audio buffer 216 of FIG. 2. For example, the volume and mute detector 320 may read a set of 512 audio samples from the audio buffer 216. Additionally, the machine readable instructions 800 may be scheduled to execute each time a new set of 512 audio samples has been stored in the audio buffer 216. After the audio samples have been read, the volume and mute detector 320 then counts the number of zero crossings occurring in the set of samples read from the audio buffer (block 808). As is known, a zero crossing is said to occur when a transition from a previous sample to a next sample would require passing through zero. In the case of an audio mute state, the audio samples will typically correspond to quantization noise and, therefore, will tend to fluctuate about zero. Thus, the volume and mute detector 320 determines whether the number of zero crossings exceeds a predetermined threshold indicative of audio mute fluctuation (block 812). If the number of zero crossings exceeds the threshold (block 812), then the volume and mute detector 320 reports that the monitored audio signal corresponds to an audio mute state (block 816). The example process 800 then ends.

If, however, the number of zero crossings does not exceed the threshold (block 812), then the volume and mute detector 320 determines the energy of the audio samples (block 820). The volume and mute detector 320 then compares the audio energy to a predetermined threshold indicative of an audio mute state (block 824). If the audio energy is less than this threshold (block 824), then the volume and mute detector 320 reports an audio mute state (block 816) and the example process 800 ends. If, however, the audio energy is not less than the threshold (block 824), then the volume and mute detector 320 reports the volume level of the audio samples, for example, based on quantizing the audio energy to correspond to a set of predetermined volume levels (block 828). The example process 800 then ends.

Figure 9:
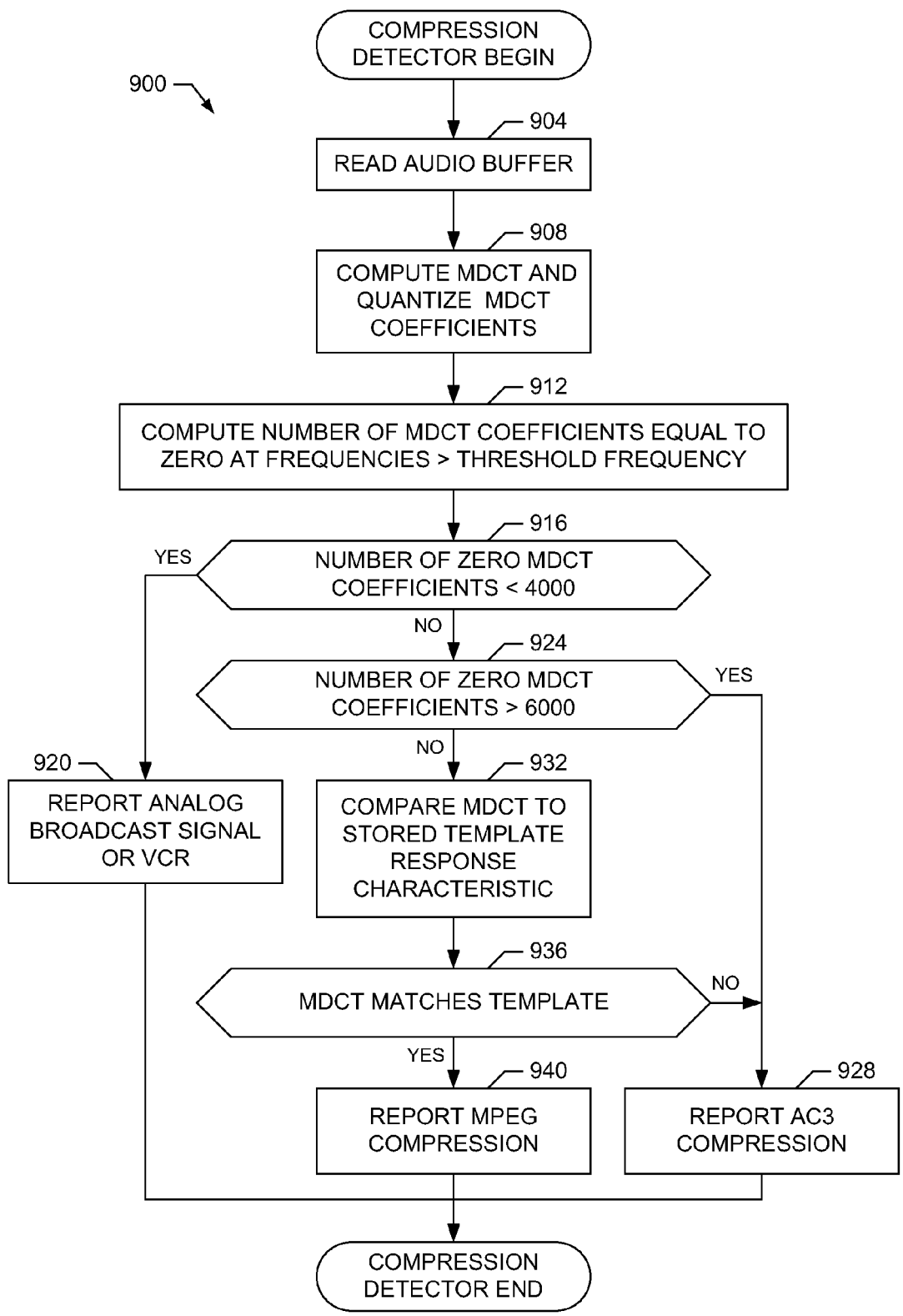
FIG. 9 is a flowchart representative of example machine readable instructions that may be executed to implement the example compression detector of FIG. 3.

Example machine readable instructions 900 that may be executed to implement the compression detector 324 of FIG. 3 are shown in FIG. 9. The machine readable instructions 900 begin execution at block 904 at which the compression detector 324 reads samples from an audio buffer such as, for example, the audio buffer 216 of FIG. 2. For example, the compression detector 324 may read a set of 256 audio samples generated by sampling the audio input signals 204 at a rate of 48 kHz, as discussed above, from the audio buffer 216. Additionally, the machine readable instructions 900 may be scheduled to execute each time a new set of 256 audio samples has been stored in the audio buffer 216. After the audio samples have been read, the compression detector 324 then computes a modified discrete cosine transform (MDCT) of the audio samples and may quantize the coefficients to correspond, for example, to the quantization used in AC3 audio compression (block 908). For example, the compression detector 324 may compute an MDCT having a length of 256 corresponding to 256 MDCT coefficients by processing 512 audio samples with an overlap of 256 samples (e.g., corresponding to 256 "old" samples read during a previous execution of the process 900 and 256 "new" samples read from the audio buffer 216 during the current execution of the process 900). Then, for a one second window of audio samples, the compression detector 324 determines the number of MDCT coefficients having a substantially zero value at frequencies greater than a predetermined threshold frequency (block 912). The predetermined threshold frequency corresponds to the audio passband associated with AC3 audio compression. Therefore, if the audio samples correspond to an audio signal that has already been subjected to AC3 compression, MDCT coefficients corresponding to frequencies greater than the passband threshold will be substantially equal to zero. In the example described herein, the predetermined threshold frequency corresponds approximately to MDCT coefficient bin 220. Thus, the compression detector 324 determines whether the number of zero MDCT coefficients in the example frequency region corresponding to the MDCT coefficient bins 220 through 256 is less than 4000 (block 916). If the number of zero MDCT coefficients is less than 4000, then the audio signal has not been subjected to compression and the compression detector 324 reports that the monitored A/V content corresponds to a broadcast analog transmission or a VCR playback (block 920). The example process 900 then ends.

If, however, the number of zero MDCT coefficients is not less than 4000 (block 916), then the compression detector 324 determines whether the number of MDCT coefficients in the examined frequency region corresponding to the MDCT coefficient bins 220 through 256 is greater than 6000 (block 924). If the number of zero MDCT coefficients exceeds 6000 (block 924), then the compression detector 324 determines that the audio signal is substantially equal to zero at these frequencies and, thus, that the audio signal has been subjected to AC3 compression (block 928). The example process 900 then ends. However, if the number of zero MDCT coefficients does not exceed 6000 (block 924), then the compression detector 324 compares the MDCT coefficients to a stored template corresponding to the frequency response of the subband filters used in MPEG audio compression (block 932). If the MDCT coefficients match the template (block 936), then the compression detector 324 reports that the audio signal has been subjected to MPEG audio compression (block 940). However, if the MDCT coefficients do not match the template (block 936), then compression detector 324 reports that the audio signal has been subjected to AC3 compression (block 928). The example process 900 then ends.

Figure 10:
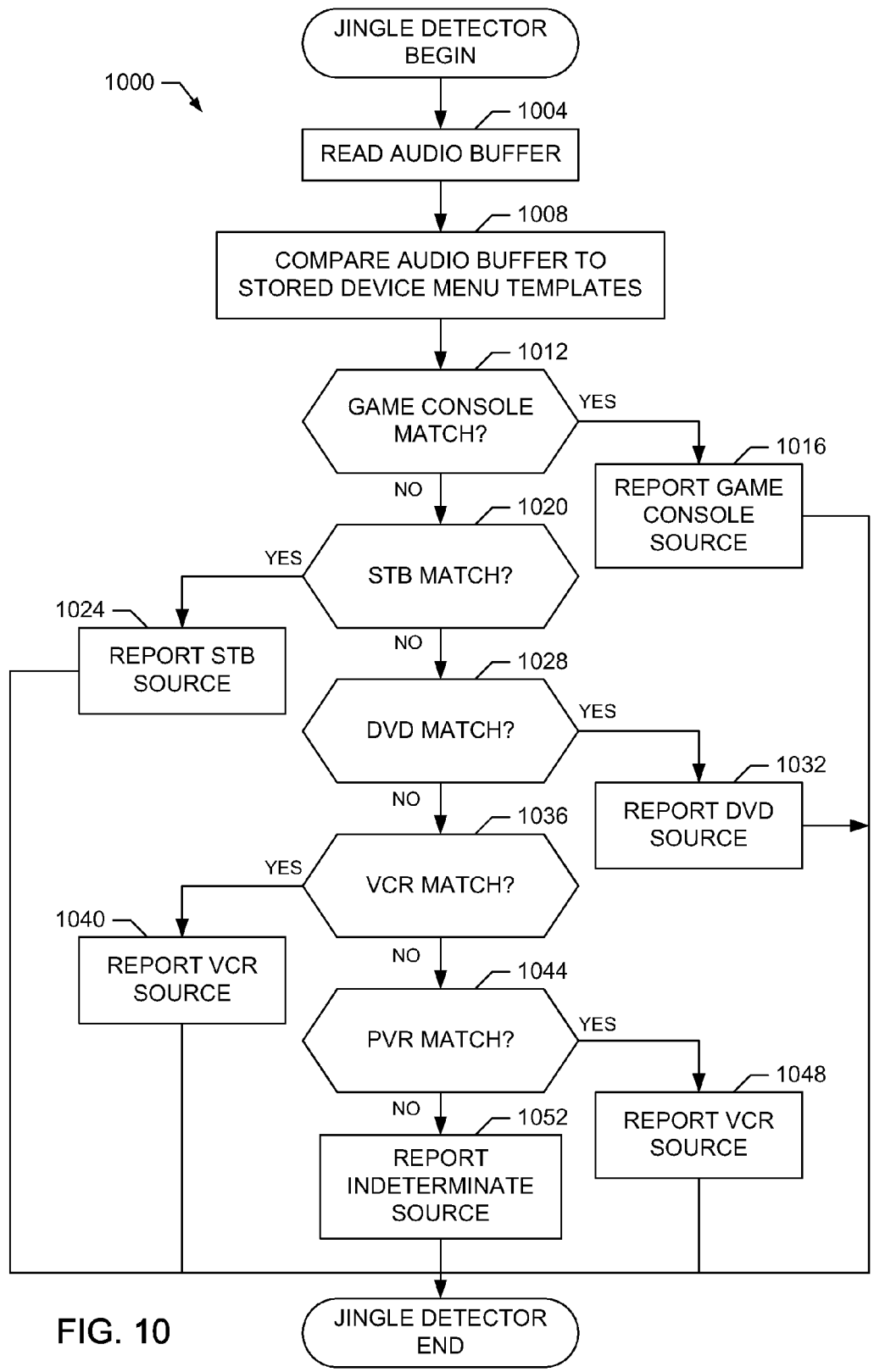
FIG. 10 is a flowchart representative of example machine readable instructions that may be executed to implement the example jingle detector of FIG. 3.

Example machine readable instructions 1000 that may be executed to implement the jingle detector 328 of FIG. 3 are shown in FIG. 10. The machine readable instructions 1000 begin execution at block 1004 at which the jingle detector 328 reads samples from an audio buffer such as, for example, the audio buffer 216 of FIG. 2. For example, the jingle detector 328 may read a set of 512 audio samples from the audio buffer 216. Additionally, the machine readable instructions 1000 may be scheduled to execute each time a new set of 512 audio samples has been stored in the audio buffer 216. After the audio samples have been read, the jingle detector 328 then compares the audio samples to a set of stored reference templates corresponding to known audio jingles for various possible A/V content sources (block 1008). As discussed above, the comparison may be performed using, for example, any known technique for comparing audio signatures. If the audio samples match a template corresponding to a game console jingle (block 1012), the jingle detector 328 reports that the A/V content source is a game console (block 1016) and the example process 1000 ends. If, however, the audio samples match a template corresponding to an STB jingle (block 1020), the jingle detector 328 reports that the A/V content source is an STB (block 1024) and the example process 1000 ends.

If, however, the audio samples match a template corresponding to a DVD player jingle (block 1028), the jingle detector 328 reports that the A/V content source is a DVD player (block 1032) and the example process 1000 ends. If, however, the audio samples match a template corresponding to a VCR jingle (block 1036), the jingle detector 328 reports that the A/V content source is a VCR (block 1040) and the example process 1000 ends. If, however, the audio samples match a template corresponding to a PVR/DVR jingle (block 1044), the jingle detector 328 reports that the A/V content source is a PVR/DVR player (block 1048) and the example process 1000 ends. However, if the audio samples do not match any of the stored reference templates, then the jingle detector 328 reports that the A/V content source is indeterminate (block 1052) and the example process 1000 then ends.

Figure 11:
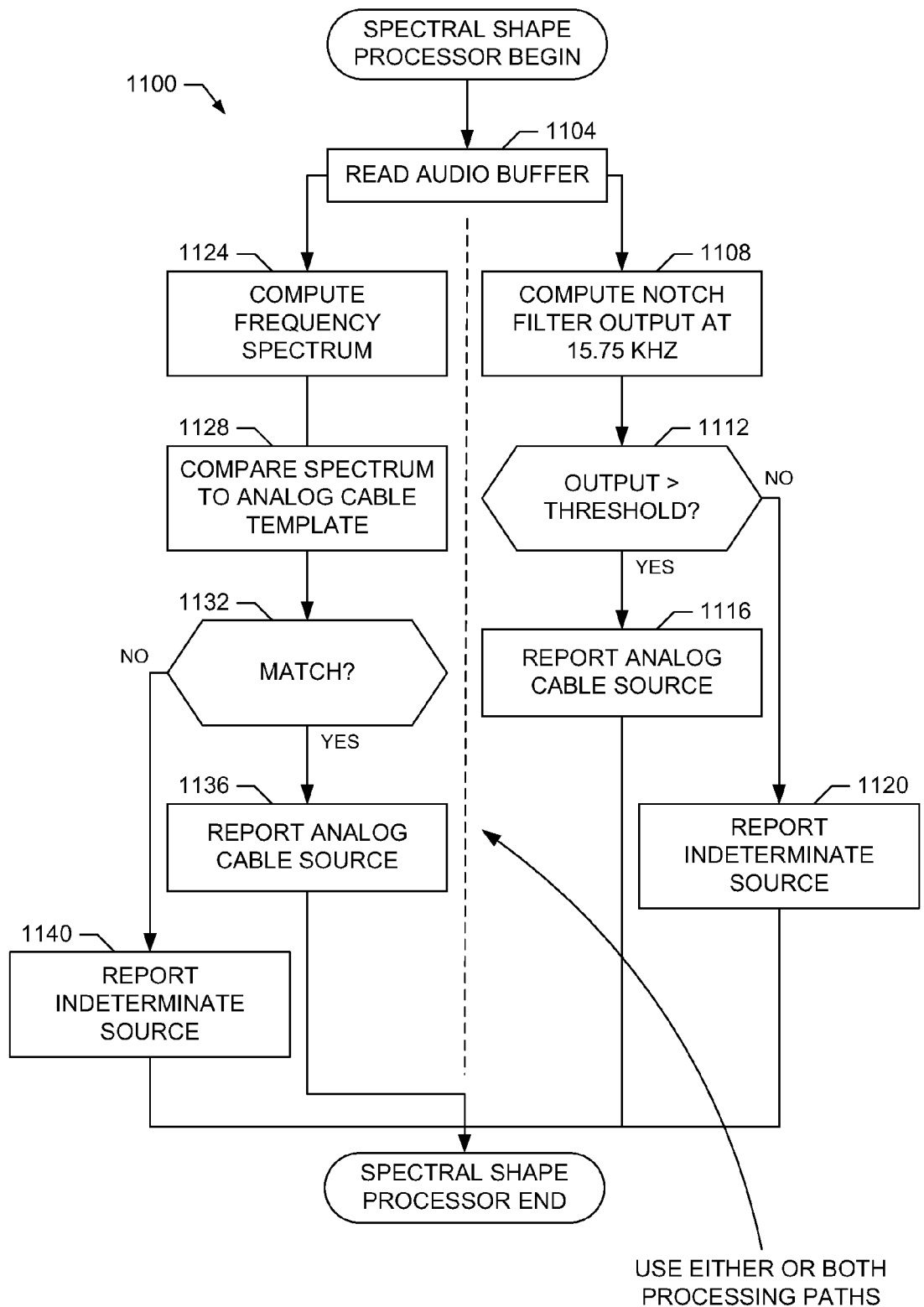
FIG. 11 is a flowchart representative of example machine readable instructions that may be executed to implement the example spectral shape processor of FIG. 3.

Example machine readable instructions 1100 that may be executed to implement the spectral shape processor 332 of FIG. 3 are shown in FIG. 11. The machine readable instructions 1100 begin execution at block 1104 at which the spectral shape processor 332 reads samples from an audio buffer such as, for example, the audio buffer 216 of FIG. 2. For example, the spectral shape processor 332 may read a set of 512 audio samples from the audio buffer 216. Additionally, the machine readable instructions 1100 may be scheduled to execute each time a new set of 512 audio samples has been stored in the audio buffer 216. After the audio samples have been read, the process 1100 may then proceed along one or both of the following paths. In the case of the first processing path, the spectral shape processor 332 applies a notch filter centered at 15.75 kHz to the audio samples (block 1108). The spectral shape processor 332 then determines whether the output of the notch filter exceeds a predetermined threshold (block 1112). The predetermined threshold corresponds to spectral leakage expected with an analog cable television system. If the notch filter output exceeds the threshold (block 1112), then the spectral shape processor 332 reports that the A/V content source is an analog cable television broadcast (block 1116). If, however, the notch filter output does not exceed the threshold (block 1112), them the spectral shape processor 332 reports that the A/V content source is indeterminate (block 1120). The example process 1100 then ends.

In the case of the second processing path, the spectral shape processor 332 computes a frequency spectrum (e.g., based on a fast Fourier transform or FFT) corresponding to the audio samples (block 1124). The spectral shape processor 332 then compares the audio frequency spectrum to a template corresponding to the expected frequency response of an analog cable system (block 1128). If the audio frequency spectrum matches the template (block 1132), then the spectral shape processor 332 reports that the A/V content source is an analog cable television broadcast (block 1136). If the audio frequency spectrum does not match the template (block 1132), then the spectral shape processor 332 reports that the A/V content source is indeterminate (block 1140). The example process 1100 then ends.

Figure 12:
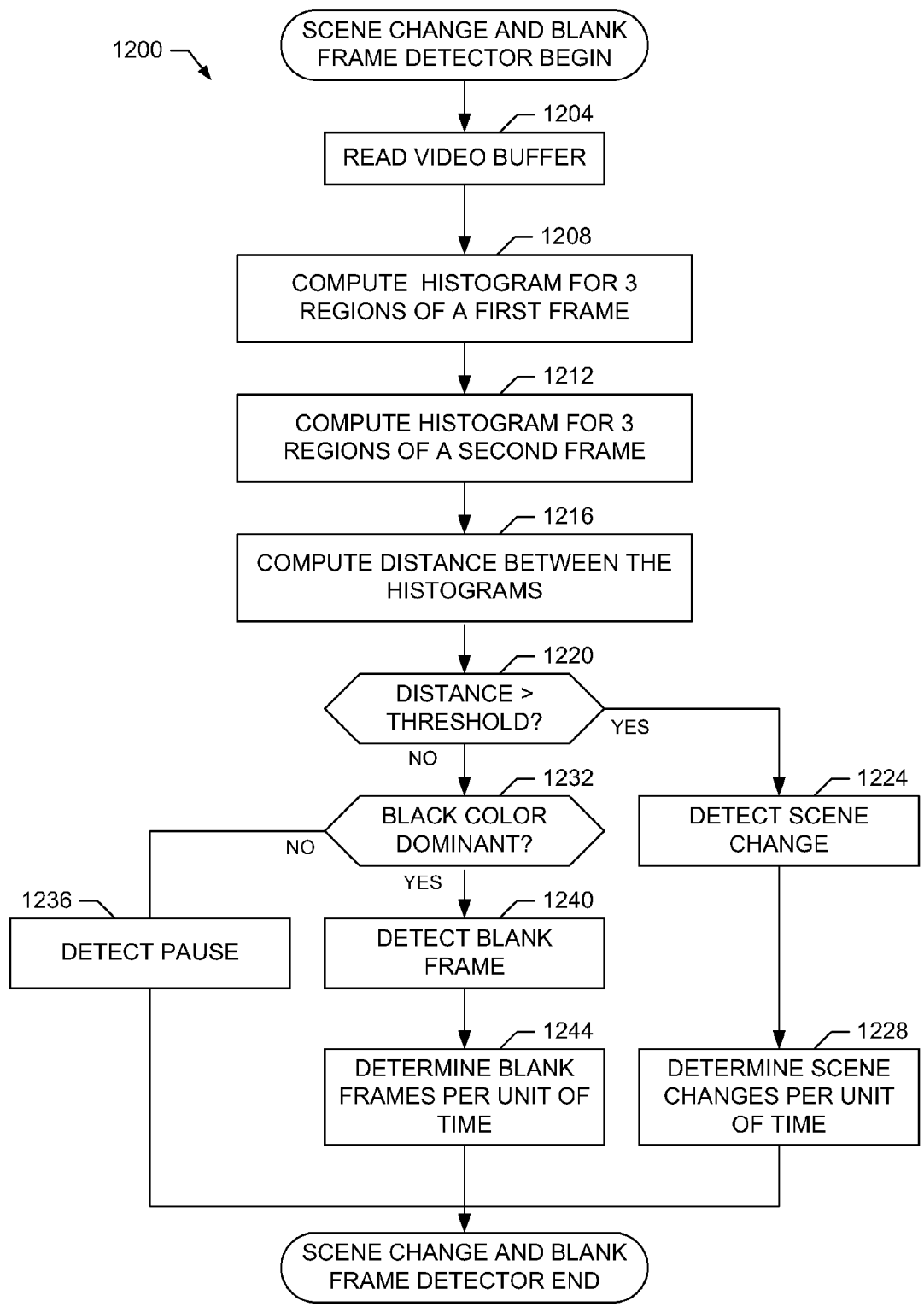
FIG. 12 is a flowchart representative of example machine readable instructions that may be executed to implement the example scene change and blank frame detector of FIG. 4.

Example machine readable instructions 1200 that may be executed to implement the scene change and blank frame detector 420 of FIG. 4 are shown in FIG. 12. The machine readable instructions 1200 begin execution at block 1204 at which the scene change and blank frame detector 420 reads samples from a video buffer such as, for example, the video buffer 224 of FIG. 2. For example, the video buffer 224 may store video samples corresponding to an input frame rate of 30 frames/sec with a resolution of 640 by 480 pixels. This results in a buffer size of 640×480×3 bytes, where the factor of 3 corresponds to storing 3 colors (e.g., red, green and blue) per pixel, where each color is represented with 1 byte=8 bits. The machine readable instructions 1200 may be scheduled to execute each time the video buffer 224 is filled, which corresponds to processing each sampled video frame. After the video samples have been read, the scene change and blank frame detector 420 computes histograms of the pixel luminance values corresponding to three regions in a first video frame (block 1208). A person of ordinary skill in the art will appreciate that fewer or greater than three regions may be used depending on, for example, the size of the regions and the frequency with which the process 1200 is performed. Next, the scene change and blank frame detector 420 computes histograms of the pixel luminance values corresponding to the same three regions but in a second video frame (block 1216). Then, the scene change and blank frame detector 420 computes the distance between the histograms of the first frame and the second frame (block 1216). For example, this distance may be computed by computing an absolute difference between corresponding histogram bins in the two frames and then summing the absolute differences.

The scene change and blank frame detector 420 then compares the histogram distance to a predetermined threshold corresponding to an expected luminance change associated with a scene change (block 1220). If the histogram distance exceeds the threshold (block 1220), then the scene change and blank frame detector 420 reports that a scene change has occurred (block 1224). Additionally, the scene change and blank frame detector 420 may determine the number of scene changes that occur per unit time (block 1228). If, however, the histogram distance does not exceed the threshold (block 1220), then the scene change and blank frame detector 420 determines whether the histograms are dominated by a black luminance value (or range of values) (block 1232). If black is not dominant (block 1232), then the scene change and blank frame detector 420 reports that the current video frame corresponds to a paused state (block 1236). However, if black is dominant (block 1232), then the scene change and blank frame detector 420 reports that a blank frame has occurred (block 1240). Additionally, the scene change and blank frame detector 420 may determine the number of blank frames that occur per unit time (1244). The number of blank frames per unit time may be used to determine, for example, whether the monitored video corresponds to a transition from broadcast content to the insertion of a commercial. The example process 1200 then ends.

Figure 13:
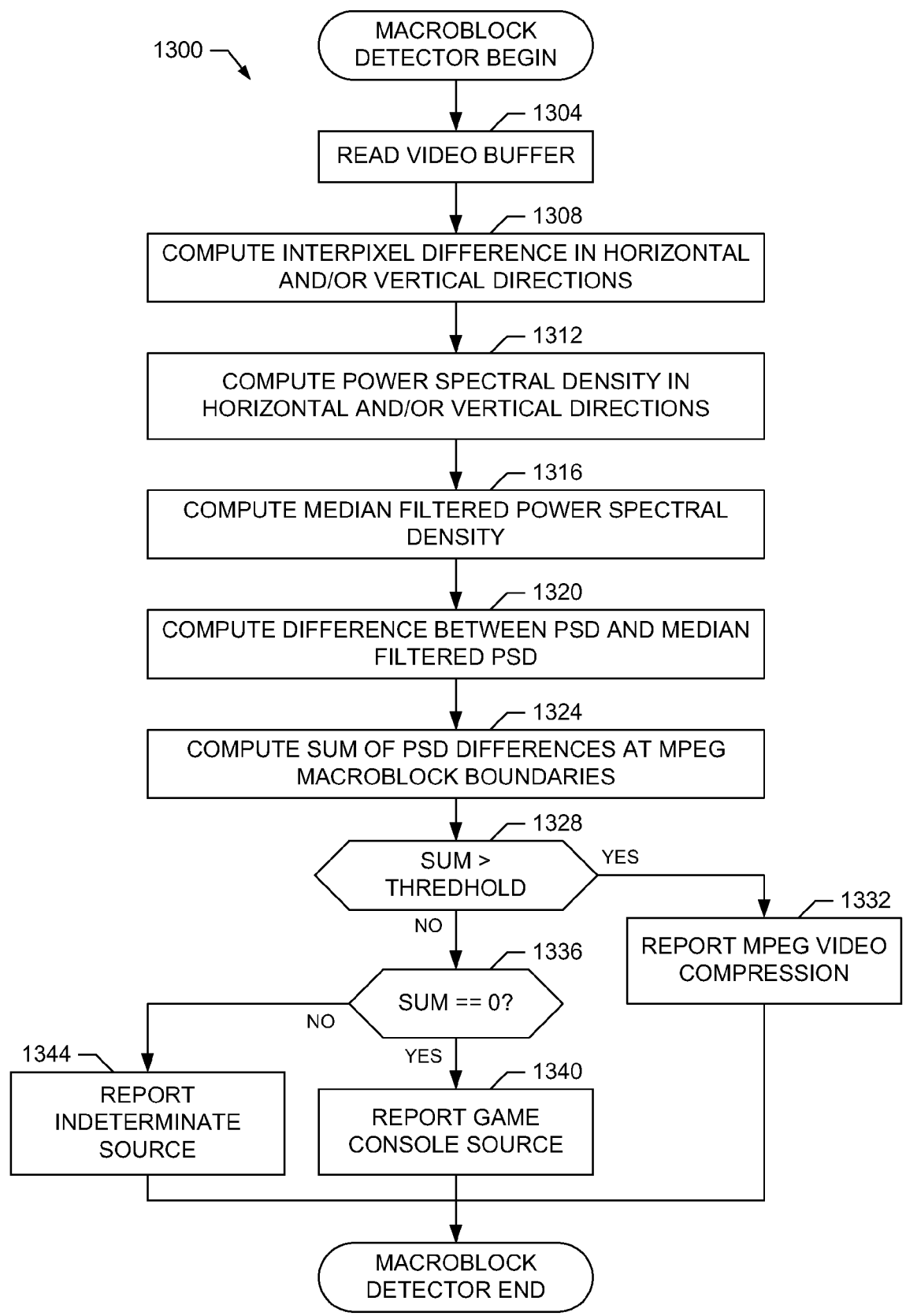
FIG. 13 is a flowchart representative of example machine readable instructions that may be executed to implement the example macroblock detector of FIG. 4.

An example process 1300 that may be used to implement the macroblock detector 424 of FIG. 4 is shown in FIG. 13. The process 1300 begins at block 1304 at which the macroblock detector 424 reads samples from a video buffer such as, for example, the video buffer 224 of FIG. 2. For example, the video buffer 224 may store video samples corresponding to an input frame rate of 30 frames/sec with a resolution of 640 by 480 pixels. This results in a buffer size of 640×480×3 bytes, where the factor of 3 corresponds to storing 3 colors (e.g., red, green and blue) per pixel, where each color is represented with 1 byte=8 bits. The process 1300 may be scheduled to process, for example, every $10^{th}$ sampled video frame.

As discussed above, MPEG video compression introduces macroblocks in the video image. For example, macroblocks may be 16 pixels by 16 pixels in size. Macroblocks tend to have different average (DC) luminance values that may be used to detect the presence of macroblocking in a video image. To detect the presence of macroblocking, the macroblock detector 424 computes the interpixel difference in the horizontal and/or vertical directions of a video image (block 1308). The macroblock detector 424 then computes the power spectral density (PSD) of the computed interpixel differences (block 1312). Next, the macroblock detector 424 median filters the PSD (block 1316), computes the difference between the original PSD and the median filtered PSD (1320) and sums the differences (block 1324). Median filtering is known and may be used to smooth transitions in an image. For example, a 3 by 3 median filter replaces a given pixel with the median of the nine pixels adjacent to and including the given pixel. Therefore, due to the different average values of different macroblocks, a video image exhibiting macroblocking will have a large sum of PSD differences as compared to a video image that does not exhibit macroblocking.

Thus, the macroblock detector 424 then compares the sum of PSD differences to a predetermined threshold set to detect macroblocking (block 1328). If the sum of PSD differences exceeds the threshold (block 1328), then the macroblock detector 424 detects macroblocking and reports that the monitored video signal has been subjected to video compression (block 1332). If, however, the sum of PSD differences does not exceed the threshold (block 1328), the macroblock detector 424 determines whether the sum is substantially equal to zero (block 1336). A substantially zero sum is indicative of perfect color matching, typically associated with video game content. Thus, if the sum of PSD differences is substantially zero (block 1336), the macroblock detector 424 reports that the A/V content source corresponds to a game console (block 1340). Otherwise, the macroblock detector 424 reports that the A/V content source is indeterminate (block 1344). The example process 1300 then ends.

Figure 14:
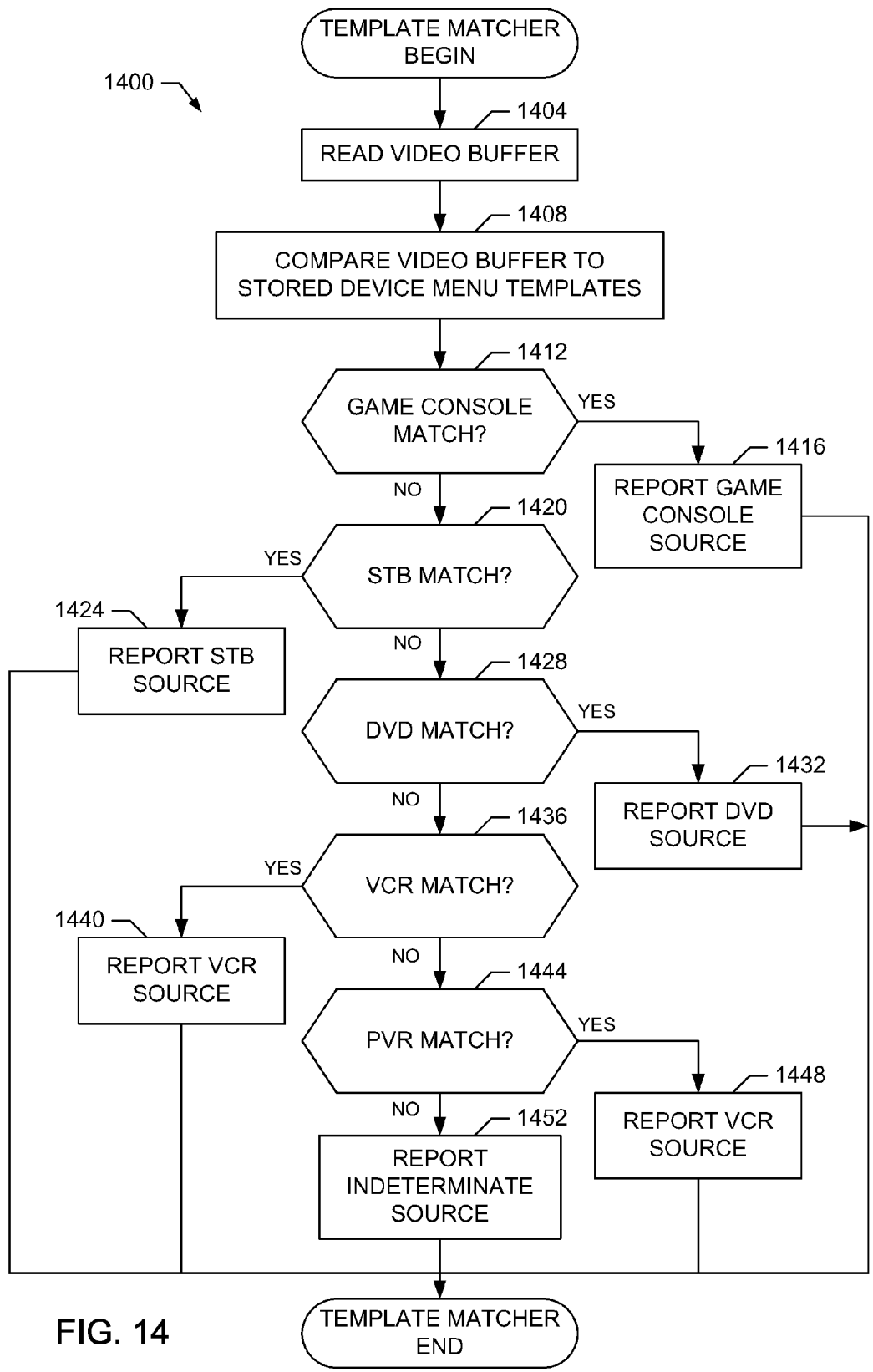
FIG. 14 is a flowchart representative of example machine readable instructions that may be executed to implement the example template matcher of FIG. 4.

Example machine readable instructions 1400 that may be executed to implement the template matcher 428 of FIG. 4 are shown in FIG. 14. The machine readable instructions 1400 begin execution at block 1404 at which the template matcher 428 reads samples from a video buffer such as, for example, the video buffer 224 of FIG. 2. For example, the video buffer 224 may store video samples corresponding to an input frame rate of 30 frames/sec with a resolution of 640 by 480 pixels. This results in a buffer size of 640×480×3 bytes, where the factor of 3 corresponds to storing 3 colors (e.g., red, green and blue) per pixel, where each color is represented with 1 byte=8 bits. The machine readable instructions 1400 may be structured to process, for example, every $10^{th}$ sampled video frame. After the video samples have been read, the template matcher 428 then compares the video samples to a set of stored reference templates corresponding to known video frames (e.g., menu frames) for various possible A/V content sources (block 1408). If the video samples match a template corresponding to a reference game console video frame (block 1412), the template matcher 428 reports that the A/V content source is a game console (block 1416) and the example process 1400 ends. If, however, the video samples match a template corresponding to a reference STB video frame (block 1420), the template matcher 428 reports that the A/V content source is an STB (block 1424) and the example process 1400 ends.

If, however, the video samples match a template corresponding to a reference DVD player video frame (block 1428), the template matcher 428 reports that the A/V content source is a DVD player (block 1432) and the example process 1400 ends. If, however, the video samples match a template corresponding to a reference VCR video frame (block 1436), the template matcher 428 reports that the A/V content source is a VCR (block 1440) and the example process 1400 ends. If, however, the video samples match a template corresponding to a reference PVR/DVR video frame (block 1444), the template matcher 428 reports that the A/V content source is a PVR/DVR (block 1448) and the example process 1400 ends. However, if the video samples do not match any of the stored reference templates, then the template matcher 428 reports that the A/V content source is indeterminate (block 1452) and the example process 1400 then ends.

Figure 15:
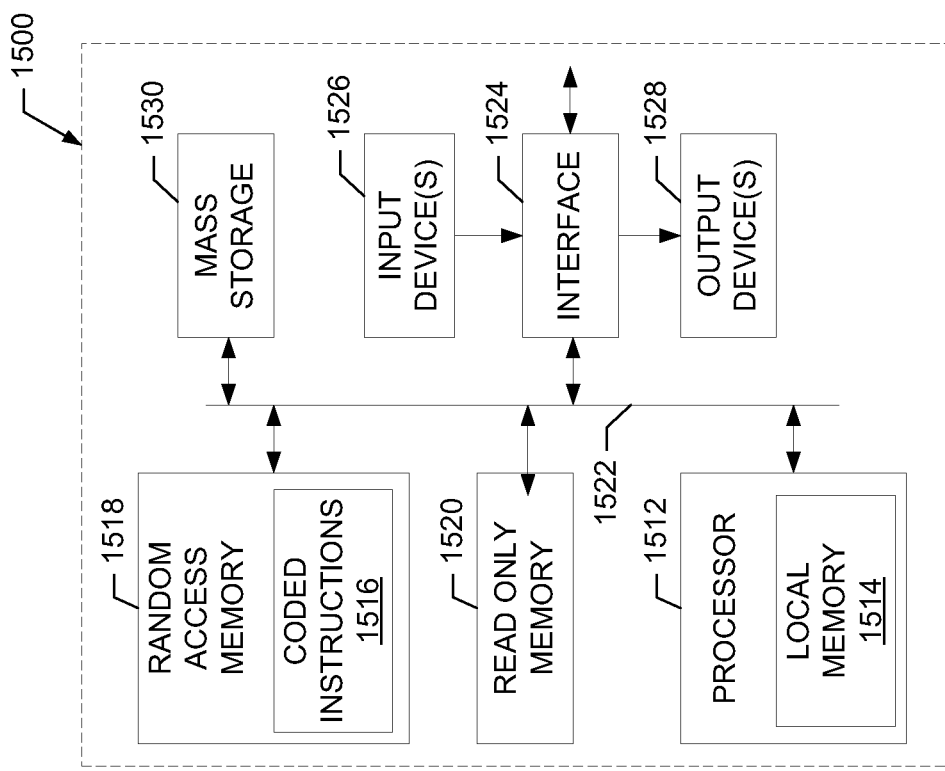
FIG. 15 is a block diagram of an example computer that may execute the example machine readable instructions of FIGS. 7A-7D, 8-13 and/or 14 to implement the example multi-engine meter of FIG. 2.

FIG. 15 is a block diagram of an example computer 1500 capable of implementing the apparatus and methods disclosed herein. The computer 1500 can be, for example, a server, a personal computer, a personal digital assistant (PDA), an Internet appliance, a DVD player, a CD player, a digital video recorder, a personal video recorder, a set top box, or any other type of computing device.

The system 1500 of the instant example includes a processor 1512 such as a general purpose programmable processor. The processor 1512 includes a local memory 1514, and executes coded instructions 1516 present in the local memory 1514 and/or in another memory device. The processor 1512 may execute, among other things, the machine readable instructions represented in FIGS. 7A-7D through FIG. 14. The processor 1512 may be any type of processing unit, such as one or more microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1512 is in communication with a main memory including a volatile memory 1518 and a non-volatile memory 1520 via a bus 1522. The volatile memory 1518 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1520 may be implemented by flash memory and/or any other desired type of memory device. Access to the main memory 1518, 1520 is typically controlled by a memory controller (not shown) in a conventional manner.

The computer 1500 also includes a conventional interface circuit 1524. The interface circuit 1524 may be implemented by any type of well known interface standard, such as an Ethernet interface, a universal serial bus (USB), and/or a third generation input/output (3GIO) interface.

One or more input devices 1526 are connected to the interface circuit 1524. The input device(s) 1526 permit a user to enter data and commands into the processor 1512. The input device(s) can be implemented by, for example, a keyboard, a mouse, a touchscreen, a track-pad, a trackball, an isopoint and/or a voice recognition system.

One or more output devices 1528 are also connected to the interface circuit 1524. The output devices 1528 can be implemented, for example, by display devices (e.g., a liquid crystal display, a cathode ray tube display (CRT)), by a printer and/or by speakers. The interface circuit 1524, thus, typically includes a graphics driver card.

The interface circuit 1524 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1500 also includes one or more mass storage devices 1530 for storing software and data. Examples of such mass storage devices 1530 include floppy disk drives, hard drive disks, compact disk drives and digital versatile disk (DVD) drives. The mass storage device 1530 may implement the audio metric registers 616-620, the video metric registers 624-628 and/or the metadata metric registers 632-636. Alternatively, the volatile memory 1518 may implement the audio metric registers 616-620, the video metric registers 624-628 and/or the metadata metric registers 632-636.

At least some of the above described example methods and/or apparatus are implemented by one or more software and/or firmware programs running on a computer processor. However, dedicated hardware implementations including, but not limited to, application specific integrated circuits (ASICs), programmable logic arrays (PLAs) and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to monitor media provided by one of a plurality of media sources for presentation by an information presenting device, the method comprising:
   determining first information based on a video signal corresponding to the monitored media;
   determining second information based on an audio signal corresponding to the monitored media; and
   identifying the one of the plurality of media sources based on a decision tree comprising a plurality of at least three decision nodes, a first decision node of the decision tree corresponding to a first classification decision resulting from processing at least one of the first information or the second information, a second decision node of the decision tree corresponding to a second classification decision resulting from processing at least one of the first information or the second information, and a third decision node of the decision tree corresponding to a third classification decision resulting from processing at least one of the first information or the second information, the second decision node of the decision tree being selected for evaluation based on an outcome of evaluating the first decision node of the decision tree, the third decision node of the decision tree being selected for evaluation based on an outcome of evaluating the second decision node of the decision tree.

2. A method as defined in claim 1 wherein the first information comprises at least one of detected metadata, detected text, a blurriness measurement, a blank frame, a macroblock measurement or a template.

3. A method as defined in claim 1 wherein the second information comprises at least one of an audio code, an audio signature, a volume measurement, an audio compression measurement, a jingle measurement or an audio spectral shape measurement.

4. A method as defined in claim 1 wherein identifying the one of the plurality of media sources comprises deciding whether the one of the plurality of media sources is associated with at least one of an analog television broadcast, an analog video-on-demand (VOD) presentation or a video cassette recorder (VCR) playback based on automated measurement of lineup (AMOL) data included in the first information and an audio spectral shape measurement included in the second information.

5. A method as defined in claim 4 further comprising deciding whether the one of the plurality of media sources is associated with the at least one of the analog television broadcast, the analog VOD presentation or the VCR playback based on whether the audio spectral shape measurement is representative of a cable television transmission system.

6. A method as defined in claim 1 wherein identifying the one of the plurality of media sources comprises deciding whether the one of the plurality of media sources is associated with at least one of a live digital television broadcast, a time-shifted digital television presentation or a digital versatile disk (DVD) presentation based on a macroblock measurement included in the first information and an audio compression measurement included in the second information.

7. A method to monitor media provided by one of a plurality of media sources for presentation by an information presenting device, the method comprising:
   determining first information based on a video signal corresponding to the monitored media;
   determining second information based on an audio signal corresponding to the monitored media; and
   identifying the one of the plurality of media sources based on a decision tree comprising a plurality of decision nodes, a first decision node of the decision tree corresponding to a first classification decision resulting from processing at least one of the first information or the second information, and a second decision node of the decision tree corresponding to a second classification decision resulting from processing at least one of the first information or the second information, the second decision node of the decision tree being selected for evaluation based on an outcome of evaluating the first decision node of the decision tree,
   wherein identifying the one of the plurality of media sources comprises deciding whether the one of the plurality of media sources is associated with at least one of a live digital television broadcast, a time-shifted digital television presentation or a DVD presentation based on a macroblock measurement included in the first information and an audio compression measurement included in the second information, and further comprising:
   deciding that the one of the plurality of media sources is the DVD presentation if the macroblock measurement is representative of a media presentation exhibiting macroblocking and the audio compression measurement is representative of AC3 compression, and
   deciding that the one of the plurality of media sources is at least one of the live digital television broadcast or the time-shifted digital television if the macroblock measurement is representative of a media presentation exhibiting substantially no macroblocking and the audio compression measurement is representative of AC3 compression.

8. A tangible machine readable storage device or storage disk comprising machine readable instructions which, when executed, cause a machine to at least:
   determine first information based on a video signal corresponding to monitored media provided by one of a plurality of media sources for presentation by an information presenting device;
   determine second information based on an audio signal corresponding to the monitored media; and
   identify the one of the plurality of media sources based on a decision tree comprising a plurality of at least three decision nodes, a first decision node of the decision tree corresponding to a first classification decision resulting from processing at least one of the first information or the second information, a second decision node of the decision tree corresponding to a second classification decision resulting from processing at least one of the first information or the second information, and a third decision node of the decision tree corresponding to a third classification decision resulting from processing at least one of the first information or the second information, the second decision node of the decision tree being selected for evaluation based on an outcome of evaluating the first decision node of the decision tree, the third decision node of the decision tree being selected for evaluation based on an outcome of evaluating the second decision node of the decision tree.

9. A storage device or storage disk as defined in claim 8 wherein the first information comprises at least one of detected metadata, detected text, a blurriness measurement, a blank frame, a macroblock measurement or a template.

10. A storage device or storage disk as defined in claim 8 wherein the second information comprises at least one of an audio code, an audio signature, a volume measurement, an audio compression measurement, a jingle measurement or an audio spectral shape measurement.

11. A storage device or storage disk as defined in claim 8 wherein the machine readable instructions, when executed, further cause the machine to decide whether the one of the plurality of media sources is associated with at least one of an analog television broadcast, an analog video-on-demand (VOD) presentation or a video cassette recorder (VCR) playback based on automated measurement of lineup (AMOL) data included in the first information and an audio spectral shape measurement included in the second information.

12. A storage device or storage disk as defined in claim 11 wherein the machine readable instructions, when executed, further cause the machine to decide whether the one of the plurality of media sources is associated with the at least one of the analog television broadcast, the analog VOD presentation or the VCR playback based on whether the audio spectral shape measurement is representative of a cable television transmission system.

13. A storage device or storage disk as defined in claim 8 wherein the machine readable instructions, when executed, further cause the machine to decide whether the one of the plurality of media sources is associated with at least one of a live digital television broadcast, a time-shifted digital television presentation or a digital versatile disk (DVD) presentation based on a macroblock measurement included in the first information and an audio compression measurement included in the second information.

14. A tangible machine readable storage device or storage disk comprising machine readable instructions which, when executed, cause a machine to at least:
 determine first information based on a video signal corresponding to monitored media provided by one of a plurality of media sources for presentation by an information presenting device;
 determine second information based on an audio signal corresponding to the monitored media; and
 identify the one of the plurality of media sources based on a decision tree comprising a plurality of decision nodes, a first decision node of the decision tree corresponding to a first classification decision resulting from processing at least one of the first information or the second information, and a second decision node of the decision tree corresponding to a second classification decision resulting from processing at least one of the first information or the second information, the second decision node of the decision tree being selected for evaluation based on an outcome of evaluating the first decision node of the decision tree, wherein the machine readable instructions, when executed, further cause the machine to:
 decide whether the one of the plurality of media sources is associated with at least one of a live digital television broadcast, a time-shifted digital television presentation or a digital versatile disk (DVD) presentation based on a macroblock measurement included in the first information and an audio compression measurement included in the second information;
 decide that the one of the plurality of media sources is the DVD presentation if the macroblock measurement is representative of a media presentation exhibiting macroblocking and the audio compression measurement is representative of AC3 compression, and decide that the one of the plurality of media sources is at least one of the live digital television broadcast or the time-shifted digital television if the macroblock measurement is representative of a media presentation exhibiting substantially no macroblocking and the audio compression measurement is representative of AC3 compression.

15. A tangible machine readable storage device or storage disk comprising machine readable instructions which, when executed, cause a machine to at least:
 count a number of zero crossings associated with a plurality of audio samples corresponding to a media presentation;
 determine whether the audio signal is muted based on whether the number of zero crossings exceeds a threshold; and
 based on whether the audio signal is determined to be muted, use the audio signal to at least one of determine a source of the media presentation or determine a special operating mode of the source of the media presentation.

16. A storage device or storage disk as defined in claim 15 wherein the machine readable instructions, when executed, further cause the machine to determine a volume of the audio signal based on an energy associated with the plurality of audio samples if the number of zero crossings does not exceed the threshold.

17. A storage device or storage disk as defined in claim 15 wherein the threshold is a first threshold and the machine readable instructions, when executed, further cause the machine to determine a volume of the audio signal based on an energy associated with the plurality of audio samples if the number of zero crossings does not exceed the first threshold and the energy exceeds a second threshold.

18. A storage device or storage disk as defined in claim 17 wherein the machine readable instructions, when executed, further cause the machine to determine that the audio signal is muted if the number of zero crossings exceeds the first threshold and the energy does not exceed the second threshold.

19. A storage device or storage disk as defined in claim 15 wherein the machine readable instructions, when executed, further cause the machine to determine that the audio signal is muted if the number of zero crossings exceeds the threshold.

20. A storage device or storage disk as defined in claim 15 wherein the machine readable instructions, when executed, further cause the machine to use the audio signal to determine the source of the media presentation if the audio signal is determined to not be muted.

21. A storage device or storage disk as defined in claim 15 wherein the machine readable instructions, when executed, further cause the machine to use the audio signal to determine the special operating mode of the source of the media presentation if the audio signal is determined to be muted.

22. A storage device or storage disk as defined in claim 21 wherein the machine readable instructions, when executed, further cause the machine to determine that the special operating mode corresponds to at least one of an audio mute mode, a pause mode or a trick mode if the audio signal is determined to be muted.

23. A tangible machine readable storage device or storage disk comprising machine readable instructions which, when executed, cause a machine to at least:
   generate a plurality of transform coefficients associated with a plurality of audio samples corresponding to a media presentation;
   examine a subset of the plurality of transform coefficients corresponding to a frequency range exceeding a threshold frequency;
   determine whether the audio signal is compressed based on a number of transform coefficients substantially equal to zero in the subset of the plurality of transform coefficients; and
   determine a source of the media presentation based on whether the audio signal is determined to be compressed.

24. A storage device or storage disk as defined in claim 23 wherein the machine readable instructions, when executed, further cause the machine to determine that the audio signal is compressed if the number of transform coefficients exceeds a threshold.

25. A storage device or storage disk as defined in claim 23 wherein the machine readable instructions, when executed, further cause the machine to:
   determine that the audio signal is compressed according to a first compression format if the number of transform coefficients exceeds a threshold; and
   determine that the audio signal is compressed according to a second compression format if the number of transform coefficients does not exceed the threshold and the plurality of transform coefficients substantially match a reference frequency characteristic.

26. A storage device or storage disk as defined in claim 25 wherein the first compression format corresponds to AC3 audio compression and the second compression format corresponds to MPEG audio compression.

27. A storage device or storage disk as defined in claim 23 wherein the machine readable instructions, when executed, further cause the machine to:
   determine that the source is a digital source if the audio signal is determined to be compressed; and
   determine that the source is an analog source if the audio signal is determined to not be compressed.

28. A tangible machine readable storage device or storage disk storing machine readable instructions which, when executed, cause a machine to at least:
   generate a plurality of interpixel differences associated with a plurality of video samples corresponding to a video frame, the video samples corresponding to a media presentation;
   determine a first power spectral density associated with the plurality of interpixel differences;
   determine a second power spectral density based on filtering the first power spectral density;
   determine whether the video signal is compressed based on a difference between the first power spectral density and the second power spectral density; and
   determine a source of the media presentation based on whether the video signal is determined to be compressed.

29. A storage device or storage disk as defined in claim 28 wherein the machine readable instructions, when executed, further cause the machine to determine that the video signal is compressed if the first power spectral density is substantially different from the second power spectral density.

30. A storage device or storage disk as defined in claim 28 wherein the machine readable instructions, when executed, further cause the machine to process the first power spectral density with a median filter to determine the second power spectral density.

31. A storage device or storage disk as defined in claim 28 wherein the machine readable instructions, when executed, further cause the machine to determine that the source is a video game presentation if the first power spectral density is substantially equal to the second power spectral density.

32. A storage device or storage disk as defined in claim 28 wherein the machine readable instructions, when executed, further cause the machine to:
   determine that the source is a digital source if the video signal is determined to be compressed; and
   determine that the source is an analog source if the video signal is determined to not be compressed.

* * * * *